(12) United States Patent
Mori et al.

(10) Patent No.: US 7,039,233 B2
(45) Date of Patent: May 2, 2006

(54) PATTERN RECOGNITION APPARATUS FOR DETECTING PREDETERMINED PATTERN CONTAINED IN INPUT SIGNAL

(75) Inventors: Katsuhiko Mori, Kanagawa (JP); Masakazu Matsugu, Chiba (JP); Osamu Nomura, Hiroshima (JP)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 10/156,118

(22) Filed: May 29, 2002

(65) Prior Publication Data

US 2002/0181765 A1   Dec. 5, 2002

(30) Foreign Application Priority Data

May 30, 2001   (JP) ........................... 2001-164283

(51) Int. Cl.
*G06K 9/00*     (2006.01)
*G06K 9/54*     (2006.01)

(52) U.S. Cl. ........................ 382/181; 382/305
(58) Field of Classification Search ............. 382/181, 382/190, 192, 194, 195, 199, 206, 226, 228, 382/305; 707/6, 510, 514, 517, 530
See application file for complete search history.

(56) References Cited

U.S. PATENT DOCUMENTS

| | | | |
|---|---|---|---|
| 5,220,559 A | | 6/1993 | Tsuzuki et al. ............. 370/60 |
| 5,519,811 A | | 5/1996 | Yoneda et al. ............. 395/24 |
| 5,524,065 A | * | 6/1996 | Yagasaki ................... 382/226 |
| 5,617,486 A | * | 4/1997 | Chow et al. ............... 382/181 |
| 5,892,962 A | | 4/1999 | Cloutier .................... 395/800 |
| 6,081,620 A | * | 6/2000 | Anderholm ............... 382/194 |

(Continued)

FOREIGN PATENT DOCUMENTS

| | | |
|---|---|---|
| JP | 6-6793 | 1/1994 |
| JP | 2679730 | 8/1997 |
| WO | 97/29437 | 8/1997 |

OTHER PUBLICATIONS

Neveu, J. N. P. and Kumar, M. J., "Implementation Of The Neocognitron On A SIMD Architecture," Intelligent Information Systems, IEEE, pp. 179–183 (1994).

Ito, Takayuki and Fukushima, Kunihiko, "Examination Of Implementing A Neural Network On A Parallel Computer— NEOCOGNITRON On NCUBE," Systems And Computers In Japan, vol. 22, No. 6, pp. 1–9 (1991).

Lee, Edward K. F. and Gulak, Glenn, A CMOS Field–Programmable Analog Array, IEEE Journal of Solid–State Circuits, vol. 26, No. 12, (1991).

LeCun, Yann and Bengio, Yoshua "Convolutional Networks For Images, Speech, And Time Series," The Handbook Of Brain Theory And Neural Networks, pp. 255–258 (1995).

*Primary Examiner*—Andrew W. Johns
*Assistant Examiner*—Amir Alavi
(74) *Attorney, Agent, or Firm*—Fitzpatrick, Cella, Harper & Scinto

(57) ABSTRACT

A pattern recognition apparatus for detecting a predetermined pattern contained in an input signal is provided with plural detecting processing parts and for detecting respectively different features for a same input, plural integrating processing parts for spatially integrating, for each process results, the features detected by the plural detecting processing parts, plural detecting memories for retaining the process results of the detecting processing parts, plural integrating memories for retaining the process results of the integrating processing parts, a global data line 1030 to which all the predetermined detecting processing parts and all the predetermined integrating memories are connected at a certain timing, and plural local data lines each of which is connected to a predetermined set of the detecting processing parts, the integrating processing parts and the detecting memory.

16 Claims, 15 Drawing Sheets

U.S. PATENT DOCUMENTS 6,192,150 B1 * 2/2001 Leow et al. ................. 382/190
6,317,517 B1 * 11/2001 Lu ............................. 382/228
6,385,339 B1 * 5/2002 Yokota et al. ............... 382/181
6,501,856 B1 * 12/2002 Kuwano et al. ............ 382/194
6,535,619 B1 * 3/2003 Suwa et al. .................. 382/101
6,675,164 B1 * 1/2004 Kamath et al. ................ 707/6
6,687,401 B1 * 2/2004 Naoi et al. ................... 382/190

* cited by examiner

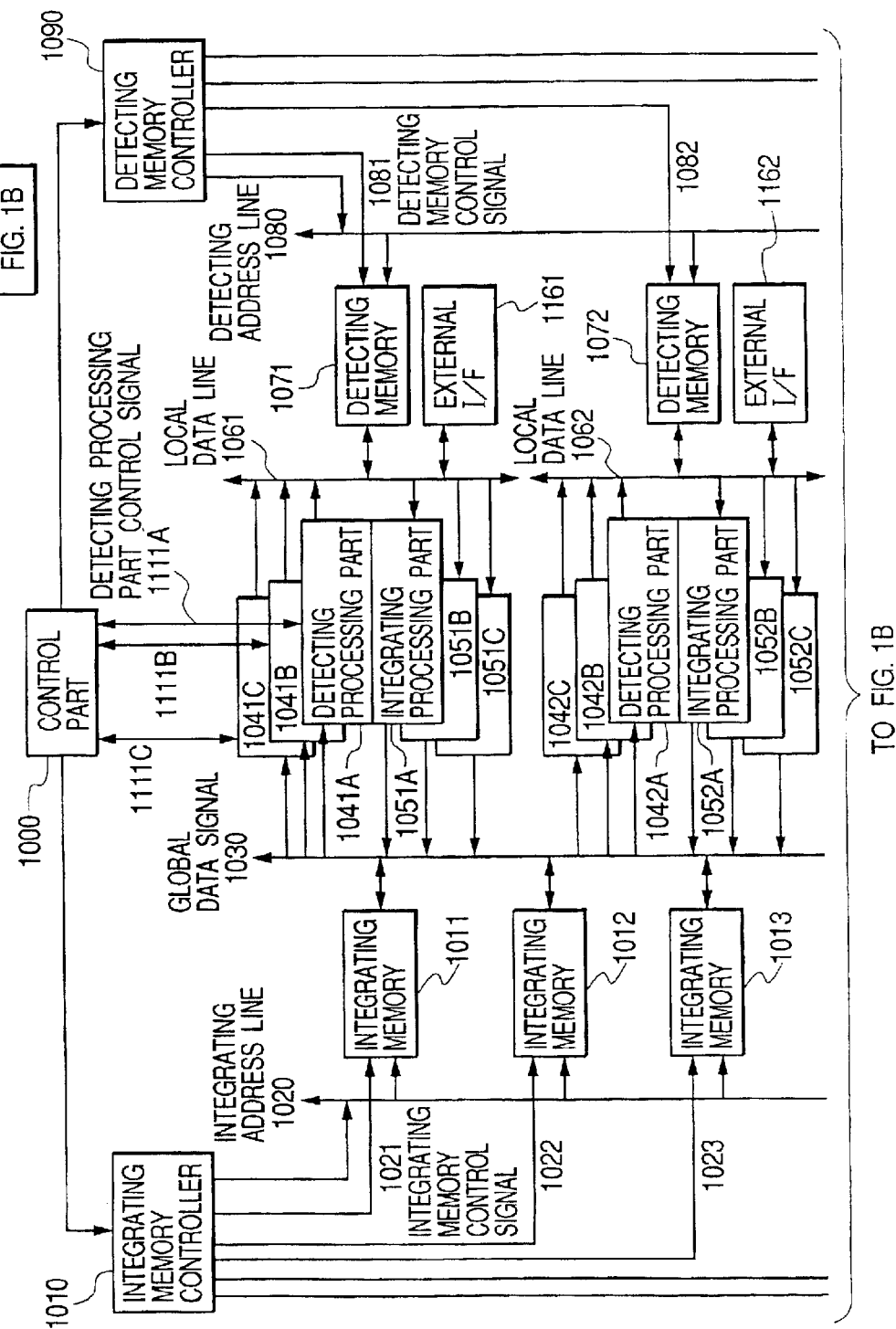

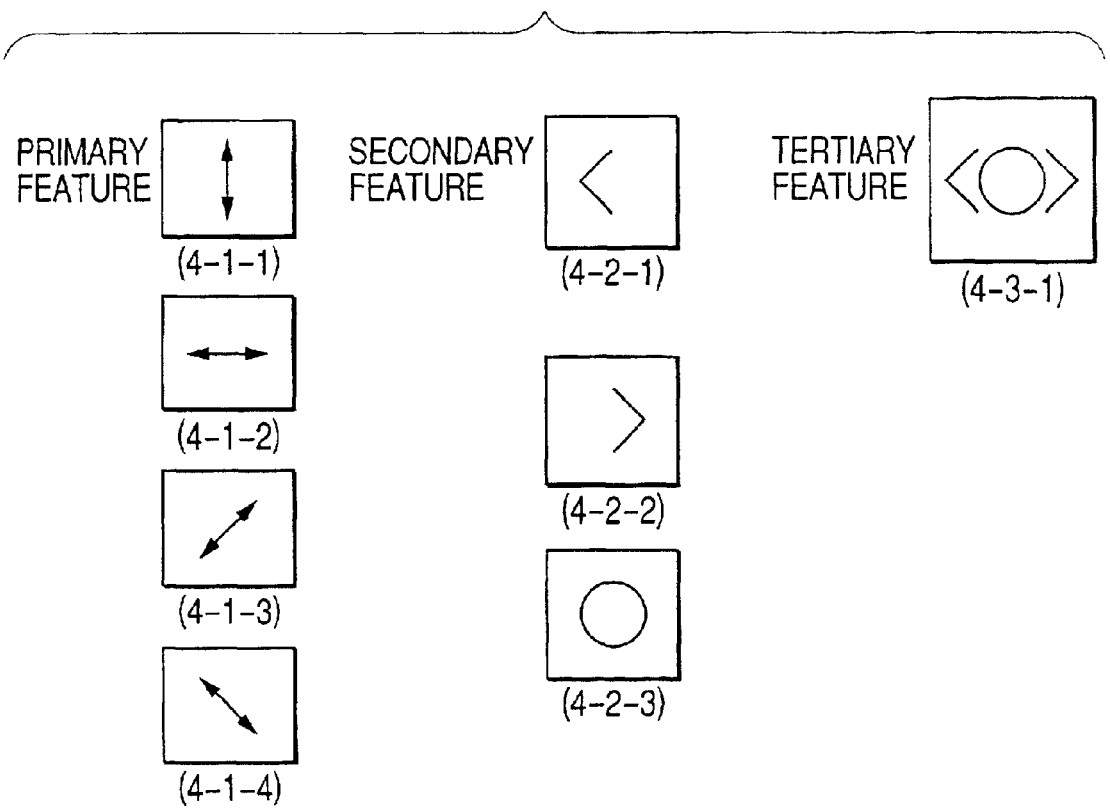

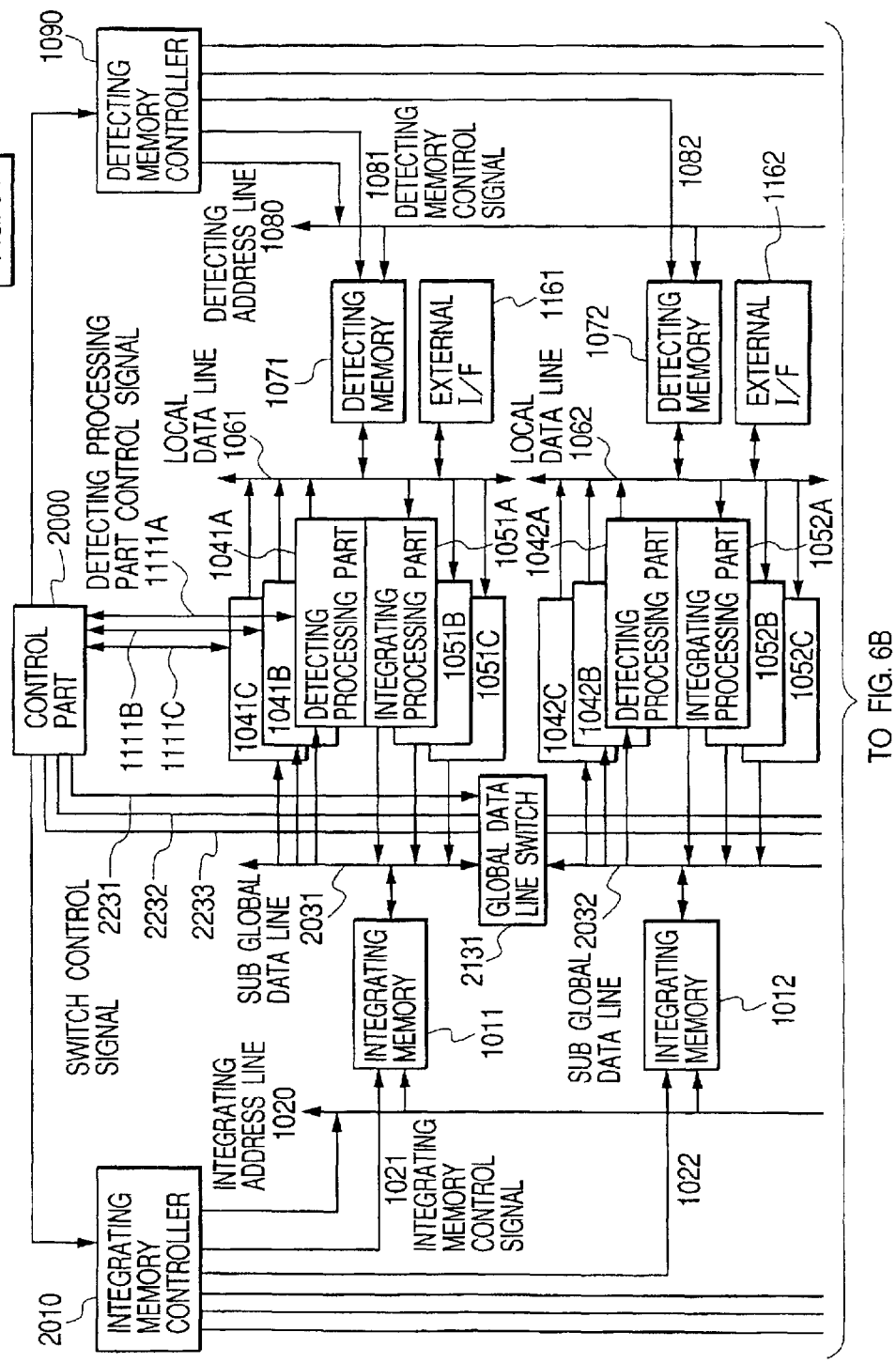

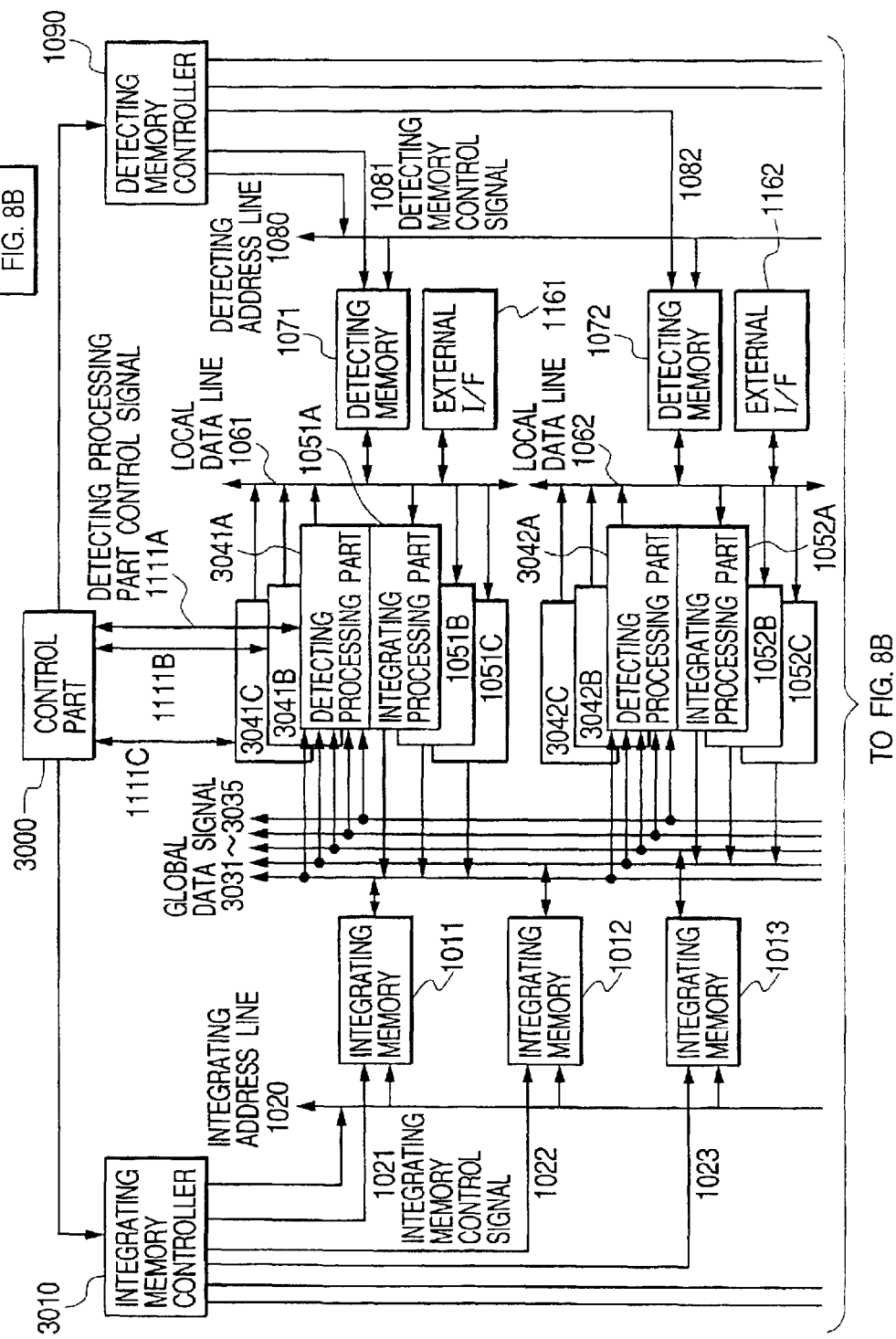

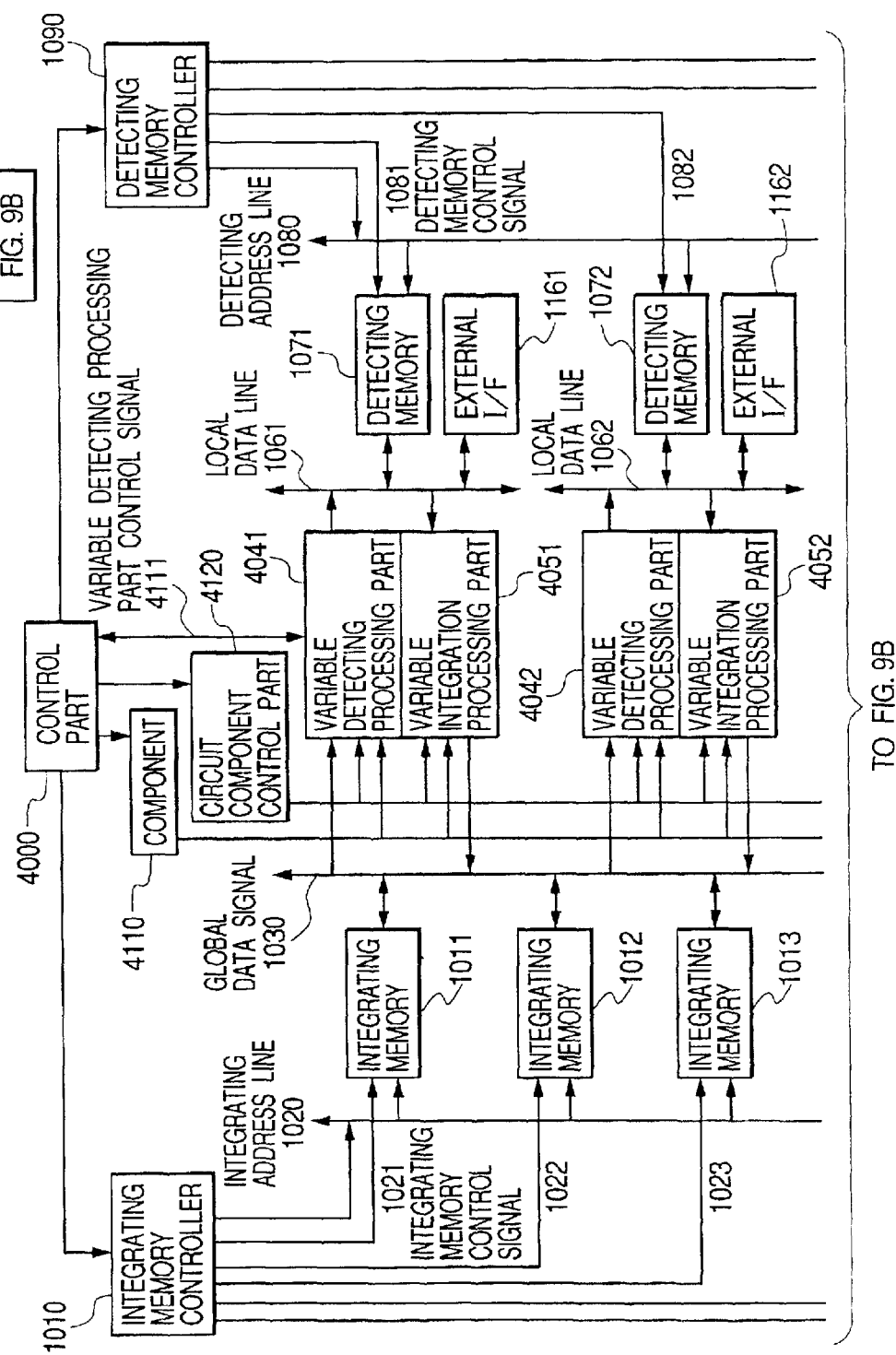

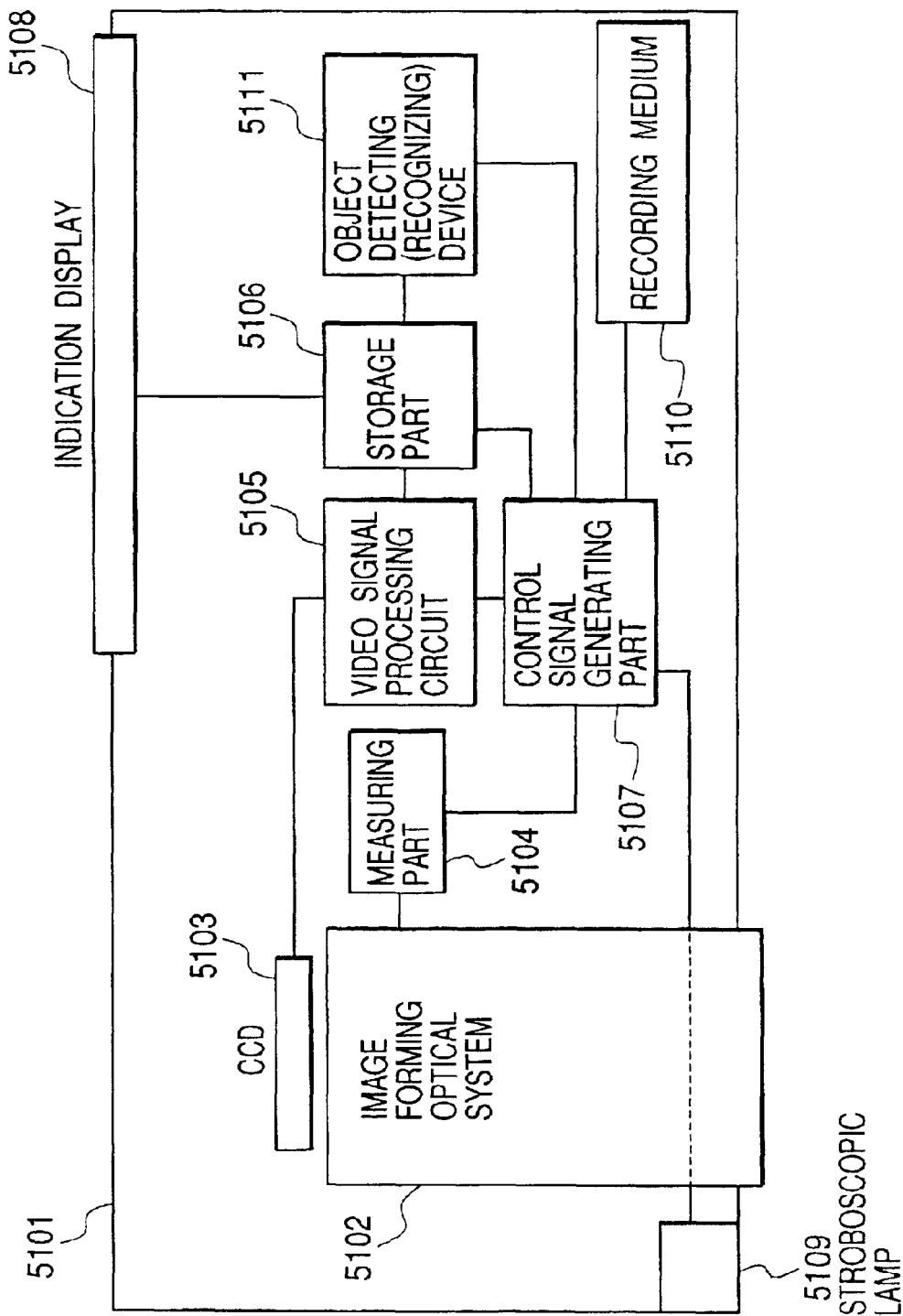

PATTERN RECOGNITION APPARATUS FOR DETECTING PREDETERMINED PATTERN CONTAINED IN INPUT SIGNAL

BACKGROUND OF THE INVENTION

1. Field of the Invention

The present invention relates to a circuit configuration of a pattern recognition apparatus for executing pattern recognition, detection of a specified object etc. by parallel operation of a neural network or the like.

2. Description of Related Art

Conventionally, the process of image recognition or voice recognition is divided into a type of executing in succession a recognition process algorithm specified for a certain object of recognition as a computer software, and a type of executing such algorithm by an exclusive parallel image processor (SIMD, MIMD machine etc.).

As for the latter, the Japanese Patent Application Laid-Open No. 6-6793 discloses an object recognition apparatus in which plural image processor units are employed to execute the process by DSP's provided in such processor units, and the obtained plural results are transferred to another unit for executing recognition of the object. For example an image is divided into plural areas which are processed in parallel respectively by the processor units, and the recognition of object is estimated in another processor unit by a neural network or fuzzy control.

Also for a hardware for executing hierarchical parallel processing by neural network, the Japanese Patent No. 2679730 discloses the architecture of a hierarchical neural network enabling to realize a multi-layered architecture by time-shared multiplex use of a single-layered hardware. It intends to realize multiple layers in equivalent manner by time-shared multiplex use of a single-layered hardware, and provides a neural network, formed by mutual connection of plural neuron models and comprising a single-layered unit assembly including plural neuron model units each of which is capable of generating a product of a time-shared multiplex analog signal with an external digital weighting data, integrating such product by time-shared addition through a capacitor and outputting a voltage through a non-linear output function in time-shared manner, a feedback unit for feeding the output of the aforementioned single-layered unit assembly back to the input unit thereof, and a control unit for executing control for time-shared multiplexing of the analog signals from the units constituting the aforementioned single-layered unit assembly and for time-shared multiplex use of the aforementioned single-layered unit assembly through the feedback unit, whereby the neural network of a hierarchical structure in equivalent manner is constructed by the time-shared multiplex use of the single-layered unit assembly.

Also the U.S. Pat. No. 5,892,962 discloses a processor as a hardware employing FPGA (field programming gate array). In such processor, each FPGA is provided with a memory for holding the result of processing in FPGA, and the processing is executed by reading the results in such memories.

Among such conventional technologies, the object recognition apparatus disclosed in the Japanese Patent Application Laid-Open No. 6-6793 is capable of processing in several stages for the areas assigned to the image processor units and for the further divided smaller areas back to the original areas, but is incapable of hierarchical processing by parallel process' with other plural processor units for the obtained plural process results. It is also not capable of reading the results of processing, nor capable of spatially integrating the results from the areas.

Also the hierarchical neural network disclosed in the Japanese Patent No. 2679730 is associated with a drawback that the types of the practically realizable processes are quite limited because of the absence of a unit for variably and arbitrarily controlling the interlayer coupling.

Also the FPGA-based processor disclosed in the U.S. Pat. No. 5,892,962 requires complex wirings in order to read out the intermediate results retained in the memories.

SUMMARY OF THE INVENTION

In consideration of the foregoing, the object of the present invention is to provide a pattern recognition apparatus capable, with a single circuit configuration not requiring complex wirings, of executing hierarchical processing such as parallel processing with plural process units on the plural results obtained by processing in plural processors, also of spatially integrating the results of processing in the processors, and easily reading the result of each process.

according to one aspect, the present invention which achieves these objectives relates to a pattern recognition apparatus for detecting a predetermined pattern contained in an input signal, comprising plural detection process means for respectively detecting a feature for a same input, plural integrating process means for spatially integrating the features detected by the plural detection process means for each process result, plural detection memories for retaining the process results of the detection process means, plural integrating memories for retaining the process results of the integrating process means, a common data line to which all the predetermined detection process means and all the predetermined integrating memories are connected at a certain timing, and plural local data lines each of which is connected to a predetermined set of the detection process means, the integrating process means and the detection memory, wherein in entering the process results of the detection process means retained in the detection memories into the integrating process means, the data of a same address are read from the plural detection memories and entered into the integrating process means, and, in entering the process results of the integrating processing means retained in the integrating memories into the detection process means, the same data are read from the integrating memories and entered into the plural detection process means.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a view showing feature amounts;

FIG. 5 is a view showing an example of feature detection;

FIG. 7A is a view showing the concept of the function of the second embodiment, in a state where a global line data switch is turned on;

FIG. 12 is a view showing the configuration of an example in which the pattern recognition apparatus embodying the present invention is utilized in an image pickup apparatus.

DESCRIPTION OF THE PREFERRED EMBODIMENTS

In the following, the present invention will be clarified in detail by preferred embodiments thereof, with reference to the accompanying drawings.

(First Embodiment)

Figure 1B:
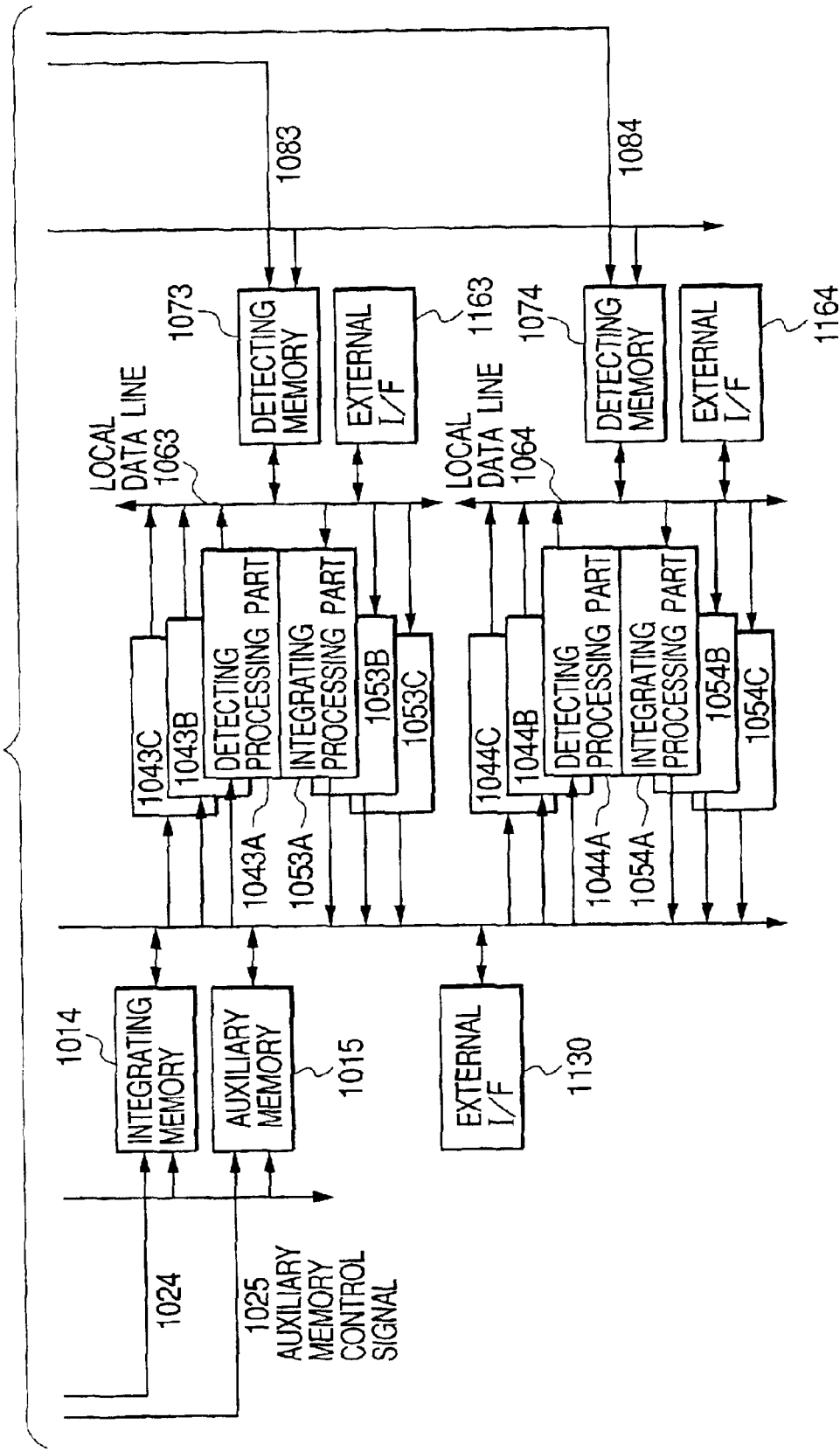
FIG. 1 is comprised of FIGS. 1A and 1B showing the configuration of a first embodiment.

FIGS. 1A and 1B are views showing the configuration of the present embodiment.

Referring to FIGS. 1A and 1B, a control part 1000 is a unit for controlling the entire circuit, communicating with an integrating memory controller 1010 to be explained later, detecting process (processing) parts 1041A to 1044C, integrating process (processing) parts 1051A to 1054C and a detection memory controller 1090 and controlling these parts based on a recognition algorithm to be used thereby executing recognition.

The integrating memory controller 1010 controls integrating memories 1011 to 1014 and an auxiliary memory 1015 thereby outputting data from these memories to a global data line 1030 and writing the data on the global data line 1030 into the integrating memories 1011 to 1014 or the auxiliary memory 1015. More specifically, it executes the aforementioned operations by outputting an address to an integrating address line 1020 and controlling integrating memory control signals 1021 to 1024 and an auxiliary memory control signal 1025 such as a chip select signal for selecting the memory to be operated and a write enable signal for selecting signal writing and signal readout.

Generation of plural addresses can be achieved in the control part 1000 by setting start and last addresses and a step number in the integrating memory controller 1010, and by counting up a counter, storing the aforementioned start address, to the last address by the aforementioned step number. Various changes in such address generation allow to achieve data readout and reading in an arbitrary area in the integrating memories 1011 to 1014 and in the auxiliary memory 1015, thereby avoiding cumbersome wirings.

The integrating memories 1011 to 1014 are used for retaining the process results of integrating process parts 1051A to 1054C to be explained later. These memories are respectively connected to the global data line 1030 and are adapted to output the retained results to the global data line 1030 or to fetch the process results of the integrating process parts 1051A to 1054C from the global data line 1030 according to the integrating memory control signals 1021 to 1024.

The auxiliary memory 1015 is used for temporarily storing the signal to be recognized, such as an image. Also this memory is connected to the integrating address line 1020 and the global data line 1030, and outputs the retained signal to the global data line 1030 or fetches the data on the global data line 1030 based on the auxiliary memory control signal 1025 from the integrating memory controller 1010.

On an integrating address line 1020, the integrating memory controller 1010 outputs a signal indicating the address of the integrating memories 1011 to 1014 and the auxiliary memory 1015. By changing such address, it is rendered possible to avoid the issue relating to the wirings and to easily read the various process results retained in the integrating memories 1011 to 1014, whereby the detecting process parts 1041A to 1044C can execute process for signals obtained by combining these results.

The integrating memory control signals 1021 to 1024 are used for selecting the integrating memories 1011 to 1014 and distinguishing or controlling the write-in and read-out thereof. By executing the memory selection on time-shared basis, it is rendered possible, at the data read-out, to output the data of the integrating memories 1011 to 1014 to the global data line 1030 on time-shared basis, and, at the data writing operation, the memories are switched in synchronization with the integrating process part control signals 1121A to 1124C to retain the process results of the integrating process parts, outputted on the global data line 1030, in the integrating memories 1011 to 1014.

The integrating memory control signal 1025 is used for selecting the auxiliary memory 1015 and distinguishing or controlling the write-in and readout thereof.

The global data line 1030 is connected to the integrating memories 1011 to 1014, the detection process parts 1041A to 1044C, the integrating process parts 1051A to 1054C and the auxiliary memory 1015. Therefore, the data of the integrating memories 1011 to 1014 are entered into the detecting process parts 1041A to 1044C at a same timing in parallel manner, and, by the time-shared process, the process results from the integrating process parts 1051A to 1054C are written into the integrating memories 1011 to 1014 on time-shared basis.

The detecting process parts 1041A to 1044C respectively share the processes required for the recognition (for example edge detection). Therefore, the apparatus of the present invention executes the recognition process in total, by combining the processes of the detecting process parts.

The detecting process parts 1041A to 1044C execute process on the data entered through the global data line 1030, and output the results respectively to the local data lines 1061 to 1064. The process results of the detecting process parts 1041A, 1041B, 1041C are outputted to the local data line 1061, and those of the detecting process parts 1042A to 1042C are outputted to the local data line 1062. The process results of other detecting process parts are also similarly outputted.

The detecting process parts 1041A to 1044C receive a same signal through the global data line 1030, but execute different processes on such input signal. The result of such process, for example of the detecting process part 1041A, is outputted to the local data line 1016 and retained in the detection memory 1071. Similarly, the process results of the detecting process parts are retained in the different detection memories 1071 to 1074. Detecting process part control signals 111A to 1114C indicate the detecting process parts to be operated. The detecting process part control signals 1111A is connected to the detecting process part 1041A, 1111B is connected to the detecting process part 1041B and so on (in FIGS. 1A and 1B, there are only shown the detecting process part control signals 1111A to 1111C). For example, at a certain timing, the detecting process part control signals 1111A, 1112A, 1113A, 1114A are enabled to operate the detecting process parts 1041A, 1042A, 1043A, 1044A, and the process results thereof are retained in the detection memories 1071 to 1074 respectively through the local data lines 1061 to 1064. Also at another timing, other detecting process part control signals are enabled.

The integrating process parts 1051A to 1054C execute integrating processes on the data entered through the local data lines 1061 to 1064, and output the results of such processes on the global data line 1030. The signals to the integrating process parts 1051A to 1051C, 1052A to 1052C, 1053A to 1053C and 1054A to 1054C are entered respectively from the local data lines 1061, 1062, 1063 and 1064. Also within the integrating process part control signals 1121A to 1124C (not shown in FIGS. 1A and 1B) from the control part 1000, process part enable signals are used to select the integrating process parts 1051A to 1054C to be operated. Also within the integrating process part control signals 1121A to 1124C, output signals are used for controlling the output timing of the process results of the integrating process parts 1051A to 1054C to the global data line 1030.

More specifically, at a certain timing, the process part select signal of the integrating process part control signals 1121A, 1122A, 1123A and 1124A are enabled to operate the integrating process parts 1051A, 1052A, 1053A and 1054A. Then, based on the output signals, the process results are outputted to the global data line 1030 in succession for example from the integrating process part 1051A. In this operation, the integrating memory controller 1010 is controlled in synchronization to retain the data on the global data line 1030 in succession in the integrating memory 1011.

The local data line 1061 is connected to the detection memory 1071, the detecting process parts 1041A to 1041C and the integrating process parts 1051A to 1051C. Also the local data line 1062 is connected to the detection memory 1072, the detecting process parts 1042A to 1042C and the integrating process parts 1052A to 1052C, and the local data lines 1063, 1064 are also similarly connected. Therefore, the process results from the detecting process parts 1041A to 1041C, 1042A to 1042C, 1043A to 1043C and 1044A to 1044C and respectively retained in the detection memories 1071, 1072, 1073 and 1074. Also the data of each detection memory are entered into the different integrating process parts, such as those from the detection memory 1071 to the integrating process parts 1051A to 1051C and those from the detection memory 1072 to the integrating process parts 1052A to 1052C, at a same timing in parallel manner.

The detection memory 1071 retains the process results from the detecting process parts 1041A to 1041C, while the detection memory 1072 retains the process results from the detecting process parts 1042A to 1042C, and the detection memories 1073 and 1074 execute similar functions. The detection memories 1071, 1072, 1073 and 1074 are respectively connected to the local data lines 1061, 1062, 1063 and 1064, and output the retained data to the local data lines 1061 to 1064 or fetch the process results of the detecting process parts 1041A to 1044C present on the local data lines 1061 to 1064, based on detection memory control signals 1081 to 1084.

On a detection address line 1080, a detection memory controller 1090 outputs a signal indicating the address of the detection memories 1071 to 1074. By changing such address, it is rendered possible to avoid the issue relating to the wirings and to easily read the process results of the arbitrary position retained in the detection memories 1071 to 1074, whereby the integrating process parts 1051A to 1054C can execute process for the result of each area.

The detection memory control signals 1081 to 1084 are used for selecting the detection memories 1071 to 1074 and distinguishing or controlling the write-in and read-out thereof.

The detection memory controller 1090 controls the detection memories 1071 to 1074, thereby outputting the data from these memories to the local data lines 1061 to 1064 or writing the data on the local data lines 1061 to 1064 into the memories. More specifically, the aforementioned operations are executed by outputting an address to the detection address line 1081 and controlling the integrating memory control signals 1081 to 1084 such as a chip select signal for selecting the memory to be operated and a write enable signal for distinguishing the writing and reading operations.

The detecting process part control signals 1111A to 1114C are used for communication between the detecting process parts 1041A to 1044C and the control part 1000, and are composed of a process part select signal for selecting the process part to be operated among the detecting process parts 1041A to 1044C, an output signal for permitting the output of the process results to the local data lines 1061 to 1064, an end signal indicating the end of the processes in the detecting process parts 1041A to 1044C etc.

The integrating process part control signals 1121A to 1214C are used for communication between the integrating process parts 1051A to 1054C and the control part 1000, and are composed of a process part select signal for selecting the process part to be operated among the integrating process parts 1051A to 1054C, an output signal for permitting the output of the process results to the global data line 1030, an end signal indicating the end of the processes in the integrating process parts 1051A to 1054C etc.

External I/F's 1130, 1161, 1162, 1163 and 1164 are respectively connected with the global data line 1030 and local data lines 1061, 1062, 1063 and 1064, and the process results of the integrating process parts 1051A to 1054C and of the detecting process parts 1041A to 1044C in the course of the operation thereof or the interim process results retained in the integrating memories 1011 to 1014 or in the detection memories 1071 to 1074 can be taken out to the exterior through such external I/F's.

Figure 2:
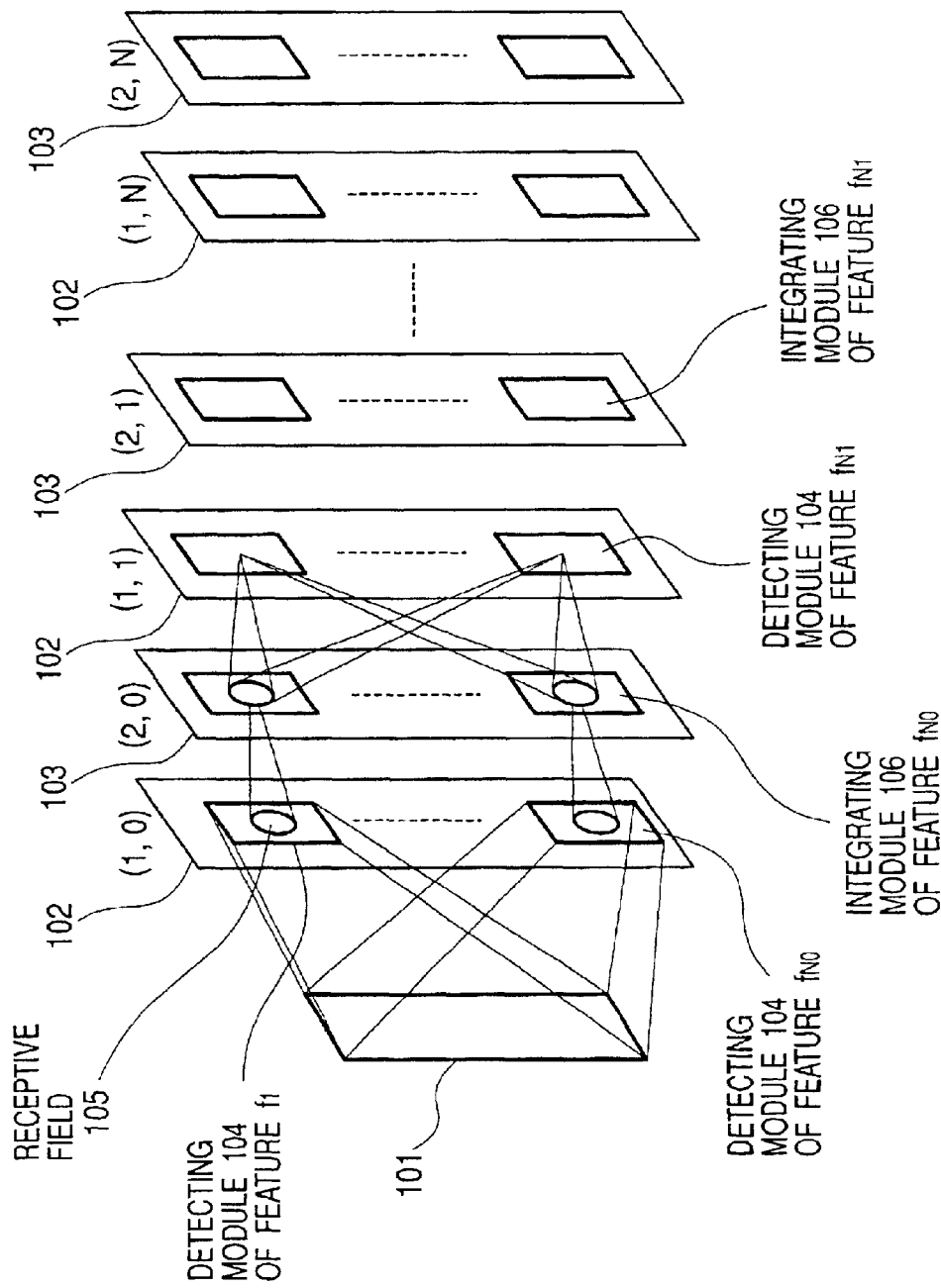
FIG. 2 is a view showing a convolutional network structure.

In the following, there will be explained the function of the configuration shown in FIGS. 1A and 1B, in case of forming a neural network for image recognition by parallel hierarchical process. At first there will be explained in detail the content of process of the neural network with reference to FIG. 2. This neural network processes, in hierarchical manner, the information relating to the recognition (detection) of an object or geometrical feature, and has a basic structure of so-called convolutional network structure (LeCun, Y. and Bengio, Y., 1995, "Convolutional Networks for Images Speech, and Time Series" in Handbook of Brain Theory and Neutral Networks (M. Arbib, Ed.), MIT Press, pp.255–258). The output from the final layer (uppermost layer) is a category of the recognized object as the result of recognition and positional information thereof on the input data.

A data input layer 101 receives local area data from a photoelectric converting element such as a CMOS sensor or a CCD element. A first feature detecting layer 102 (1,0) detects local low-level features (geometrical features such as specified directional components and specified spatial frequency components and color component features) of the image pattern entered from the data input layer 101, in local areas around various center positions in the entire image area (or local areas around predetermined sampling points over the entire image area), by a number of plural feature categories in plural scale levels or plural resolutions in each same point.

A feature integrating layer 103 (2,0) has a predetermined receiving field structure (hereinafter receiving field means the coupling range with the output element of an immediately preceding layer, and receiving field structure means the distribution of the coupling weights), and executes integration (calculation such as local averaging or sub-sampling by detection of maximum output) of the outputs of the plural neuron elements present within a same receiving field. Such integrating process has a function of spatially blurring the output from the feature detecting layer 102 (1,0) thereby tolerating positional aberration or deformation. The receiving fields of the neurons in the feature integrating layer have a common structure among the neurons within a same layer.

Like the aforementioned layers, succeeding feature detecting layers 102 ((1,1), (1,2), . . . , (1,M)) execute detection of plural different features and feature integrating layers 103 ((2,1), (2,2), . . . , (2,M)) execute integration of the detection results on the plural features from the preceding feature detecting layers. However, the former feature detecting layers are so coupled (wired) as to receive the outputs of the cell elements of the feature integrating layer of the preceding stage belonging to the same channel. The sub-sampling to be executed in the feature integrating layer executes, for example, averaging of the outputs from the local areas (local receiving fields of the neurons of such feature integrating layer) from the feature detecting cell assembly of the same feature category.

In the following, as a specific example, there will be explained the process of detecting an eye pattern from an input image, with reference to FIGS. 1 to 5.

Figure 3:
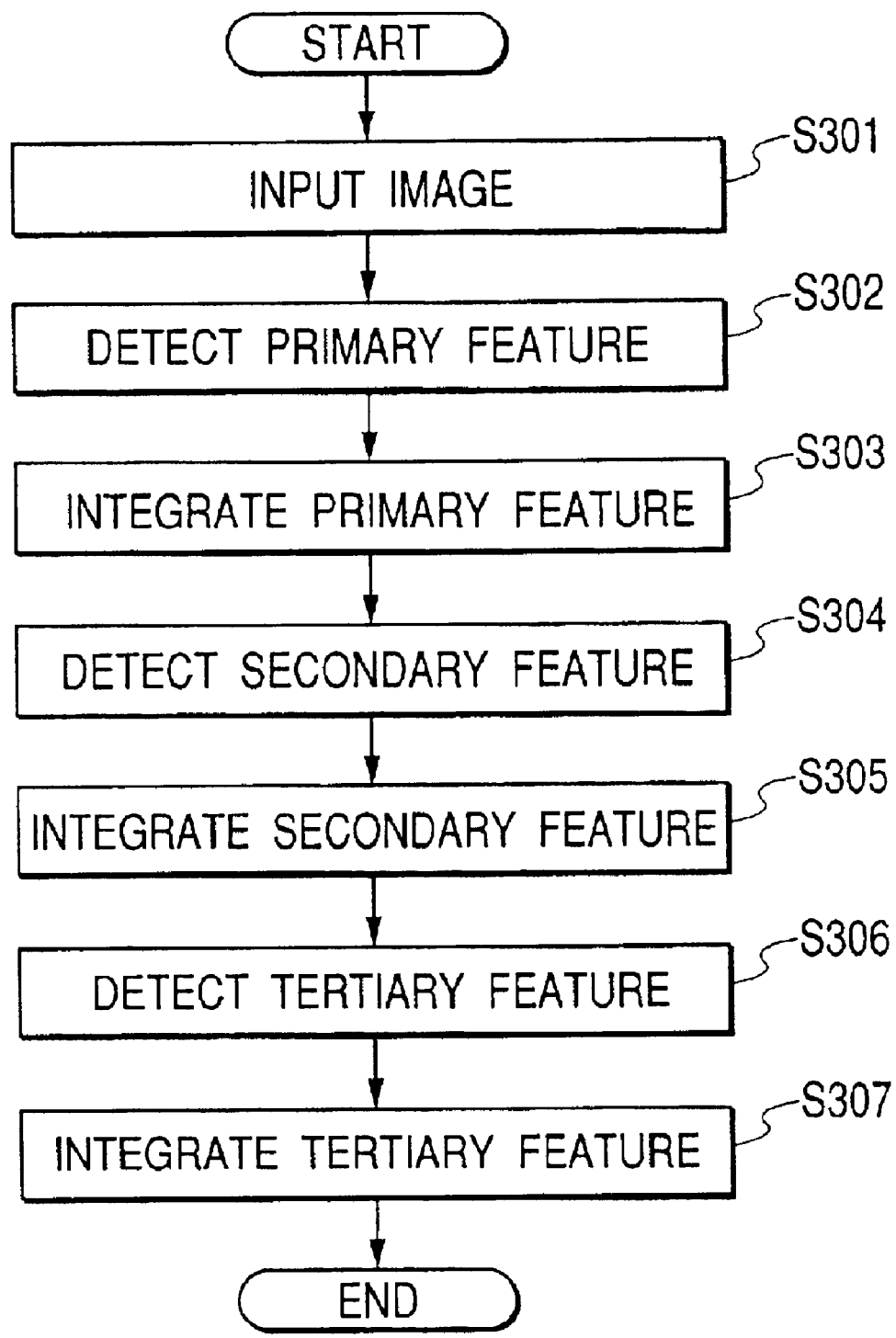
FIG. 3 is a flow chart showing the function of the first embodiment.

FIG. 3 is a flow chart for detecting an eye pattern from the input image. In a step S301, an image is entered into the auxiliary memory 1015, which corresponds to the data input layer 101. Then, in a step S302, there is detected a primary feature. The primary features in the eye detection are for example as shown in FIG. 4.

More specifically, the features of specified directions such as vertical (4-1-1), horizontal (4-1-2), diagonal upward to the right (4-1-3) and diagonal downward to the right (4-1-4) are extracted. Also secondary features are a V-pattern open to the right (4-2-1), a V-pattern open to the left (4-2-2) and a circle (4-2-3), and tertiary feature is an eye pattern (4-3-1). The detecting process parts 1041A to 1044C are so constructed as to respectively detect these features, and the detecting process parts 1041A, 1042A, 1043A and 1044A detect the primary features, respectively the vertical (4-1-1), horizontal (4-1-2), diagonal upward to the right, (4-1-3) and diagonal downward to the right (4-1-4). Similarly the detecting process parts 1041B and 1042B detect the secondary features, respectively the V-pattern open to the right (4-2-1) and the V-pattern open to the left (4-2-2), and the detecting process part 1041C detects the eye (4-3-1).

Since the present example of eye detection employs 4 primary features, 3 secondary features and 1 tertiary feature, there are only used the detecting process parts 1041A to 1044A, 1041B to 1043B and 1041C, while those 1044B and 1042C to 1044C are not used.

The primary feature detection in the step S302 corresponds to the feature detecting layer 102 (1,0), and each detecting process part corresponds to the detecting module 104 for the feature f. The integrating memory controller 1010 controls the auxiliary memory control signal 1025 to read local data around a certain center point in the image (such local area corresponds to the receiving field 105), and outputs such data to the global data line 1030. These data are entered into the detecting process parts 1041A to 1044A at a same timing in parallel manner for respective detections of the aforementioned primary features.

In this state, in the detecting process part control signals 1111A to 1114A, the process part select signals alone are in the enabled state. Then, in response to the end signal indicating the end of the process, the control part 1000 shifts the output signals to the enabled state, whereby the detecting process parts 1041A to 1044A output the process results to the local data lines 1061 to 1064. At the same time the detection memory controller 1090 outputs the address to the detection address line 1080 and controls the detection memory control signals 1081 to 1084 thereby retaining the data on the local data lines in the detection memories 1071 to 1074.

The process in each detecting process part employs the input data and the coupling weight. For example, in detecting the vertical (4-1-1) of the primary feature, there is executed a multiplication-summation calculation between the receiving field of a size of 3*3 and the receiving field structure conceptually shown in FIG. 5 with the coupling weight of 0 or 1 (hereinafter the receiving field means the coupling range with the output element of the immediately preceding layer and the receiving field structure means the distribution of the coupling weights). In this step S302, the primary feature detection is executed over the entire image area by changing the center point of the local area read from the auxiliary memory 1015 to each point in the entire image or to each of the predetermined sampling points in the entire image. Such processing over the entire image by moving the local area is executed similarly in the succeeding integrating process or in the secondary or tertiary feature detection.

A succeeding step S303 integrates the primary features. This step corresponds to the feature integrating layer 103 (2,0), and executes integration of the data retained in the detection memories 1071 to 1074 (corresponding to the integration (operations such as local averaging or sub-sampling for example by the maximum output detection) of the outputs of the plural neuron elements present within a same receiving field in the feature detecting layer 102 (1,0)). Also each integrating process part corresponds to the integrating module 106 of feature f. The detection memory controller 1090 outputs an address to the detection address line 1080, and controls the detection memory control signals 1081 to 1084 to read the local data of the detection memories 1071 to 1074, whereby the local data are entered into the integrating process parts 1051A to 1054A through the local data lines 1061 to 1064.

In the detection process in the step S302, the detecting process parts 1041A to 1044A receive the same data, but, in the integrating process in the step S303, the integrating process parts 1051A to 1054A receive respectively different data. However, since the position and size in the input image of the receiving field in this integrating process are common to all the integrating process parts 1051A to 1054A, a same address from the detection memory controller 1090 can be used to indicate the data position in the detection memories 1071 to 1074 and the receiving fields are therefore common.

Stated differently, in reading the local data from the detection memories 1071 to 1074, there are not required different addresses for such detection memories but the data readouts from the detection memories can be executed in parallel manner by a single address output, and the integrating processes in the integrating process parts 1051A to 1054A are also executed in parallel manner. The integrating process parts execute averaging of the input data, detection of the maximum value etc. as explained in the foregoing.

In this state, among the integrating process part control signals 1121A to 1124A, the process part select signals alone are in the enabled state. Then, in response to the end signal indicating the end of the process, the control part 1000 shifts the output signals to the enabled state in succession, whereby the integrating process parts 1051A to 1054A output the process results to the global data line 1030 on time-shared basis. At the same time the integrating memory controller 1010 outputs an address to the integrating address line 1020 and controls the integrating memory control signals 1021 to 1024 thereby retaining the data on the global data line in succession in the integrating memories 1011 to 1014. By matching the timing of enabling the output signals of the integrating process part control signals 1121A to 1124A with that of enabling the memory select signals of the integrating memory control signals, it is rendered possible to retain the outputs of the integrating process parts 1051A, 1052A, 1053A and 1054A respectively in the integrating memories 1011, 1012, 1013 and 1014.

Through the above-described steps, the integrating memory 1011 retains the result of integrating the detection results of the vertical directional primary feature, the integrating memory 1012 retains the result of integrating the detection results of the horizontal direction, the integrating memory 1013 retains the result of integrating the detection results of the diagonal direction upward to the right, and the integrating memory 1014 retains the result of integrating the detection results of the diagonal direction downward to the right.

A step S304 executes detection of the secondary features, corresponding to the feature detecting layer 102 (1,1). The secondary features consist of V-shapes (4-2-1, 4-2-2) and circle (4-2-3) as shown in FIG. 4. The V-shape can be detected by the detection of two diagonals (4-1-3, 4-1-4) in the primary features and the positional relationship thereof, and the circle can be detected by the detection of all the primary features in the receiving field and the positional relationship thereof. Stated differently, the secondary feature can be detected by combining the primary features of plural kinds.

The detection processes of these secondary features are executed in the detecting process parts 1041B to 1043B. The integrating memory controller 1010 outputs an address to the integrating address line 1020 and controls the integrating memory control signals 1021 to 1024 to read the integrated local data of the primary features, retained in the integrating memories 1011 to 1014, for output to the global data line 1030. In this operation, the memory select signals in the integrating memory control signals 1021 to 1024 are shifted to the enabled state in succession, whereby the integrated primary features are outputted in succession in the order of the integrating memories 1011 to 1014. Stated differently, the global data line 1030 is used on time-shared basis. As in the step S302, these data are entered into the detecting process parts 1041B to 1043B at a same timing in parallel manner, for the purpose of the detection of the aforementioned secondary features.

In this operation, since the secondary features to be detected are 3 kinds, in the detecting process part control signals, the process part select signals 1111B to 1113B alone are in the enabled state. Then, in response to the end signal indicating the end of process, the control unit 1000 shifts the output signals to the enabled state, whereby the detecting process parts 1041B to 1043B output the process results to the local data lines 1061 to 1063. At the same time the detection memory controller 1090 outputs an address to the detection address line 1080 and controls the detection memory control signals 1081 to 1083 to retain the data on the local data lines in the detection memories 1071 to 1073.

A succeeding step S305 integrates the secondary features. This step corresponds to the feature integrating layer 103 (2,1), and executes integration of the data retained in the detection memories 1071 to 1073. The detection memory controller 1090 outputs an address to the detection address line 1080, and controls the detection memory control signals 1081 to 1083 to read the local data of the detection memories 1071 to 1073, whereby the local data are entered into the integrating process parts 1051B to 1053B through the local data lines 1061 to 1063. The integrating process parts execute averaging of the input data, detection of the maximum value etc. as in the step S303. In this state, among the integrating process part control signals, the process part select signals 1121B to 1123B alone are in the enabled state. Then, in response to the end signal indicating the end of the process, the control part 1000 shifts the output signals to the enabled state in succession, whereby the integrating process parts 1051B to 1053B output the process results to the global data line 1030 on time-shared basis. At the same time the integrating memory controller 1010 outputs an address to the integrating address line 1020 and controls the integrating memory control signals 1021 to 1023 thereby retaining the data on the global data line in the integrating memories 1011 to 1013.

A step S306 executes detection of the tertiary feature, corresponding to the feature detecting layer 102 (1,2). The tertiary feature consists of an eye pattern (4-3-1) as shown in FIG. 4. The eye pattern can be detected by the detection of all the secondary features (V-shapes (4-2-1, 4-2-2) and circle (4-2-3)) in the receiving field and the positional relationship thereof. Stated differently, the tertiary feature can be detected by combining the secondary features of plural kinds. The detection process of the tertiary feature is executed in the detecting process part 1041C.

The integrating memory controller 1010 outputs an address to the integrating address line 1020 and controls the integrating memory control signals 1021 to 1023 to read the integrated local data of the secondary features, retained in the integrating memories 1011 to 1013, for output to the global data line 1030. In this operation, as in the step 304, the memory select signals in the integrating memory control signals 1021 to 1024 are shifted to the enabled state in succession, whereby the integrated primary features are outputted in succession in the order of the integrating memories 1011 to 1013, whereby the global data line 1030 is used on time-shared basis. These data are entered into the detecting process part 1041C, for the purpose of the detection of the aforementioned tertiary feature. In this operation, since the tertiary feature to be detected is only 1 kind, the process part select signal 1111C alone in the detecting process part control signals is in the enabled state. Then, in response to the end signal indicating the end of process, the control unit 1000 shifts the output signals to the enabled state, whereby the detecting process part 1041C outputs the process result to the local data line 1061. At the same time the detection memory controller 1090 outputs an address to the detection address line 1080 and controls the detection memory control signal 1081 to retain the data on the local data line in the detection memory 1071.

A succeeding step S307 integrates the tertiary feature. This step corresponds to the feature integrating layer 103 (2,2), and executes integration of the data retained in the detection memory 1071. The detection memory controller 1090 outputs an address to the detection address line 1080, and controls the detection memory control signal 1081 to read the local data of the detection memory 1071, whereby the local data of the tertiary feature are entered into the integrating process part 1051C through the local data line 1061. The integrating process part executes averaging of the input data, detection of the maximum value etc. Then, in response to the end signal indicating the end of the process, the control part 1000 shifts the output signals to the enabled state in succession, whereby the integrating process part 1051C outputs the process result to the global data line 1030. At the same time the integrating memory controller 1010 outputs an address to the integrating address line 1020 and controls the integrating memory control signal 1021 thereby retaining the data on the global data line in the integrating memory 1011.

The result retained in the integrating memory 1011 constitutes the final result of the eye detection. It is also possible to dispense with the aforementioned step S307 and to utilize the result retained in the detection memory 1071 as the result of eye detection.

As explained in the foregoing embodiment, the present invention allows to execute the detection process of plural features and the integration of the results of such detection easily in parallel manner, and it is also easy to execute such process in hierarchic manner. It is furthermore possible to prevent complication in the wirings, even in the processing of a complex receiving field structure, by temporarily retaining the results of detection or integration in memories and then entering such results into the processors through the data lines by suitably designating the addresses of such memories. It is furthermore possible to read out the results of each process or to read the result of an arbitrary position, retained in the memory, by addressing thereto.

The processes in the detecting process parts or in the integrating process parts in the present embodiment may be achieves by digital processes employing a DSP or the like, or by analog processes of converting current value or pulse width in an analog circuit. In case of digital process, the memory can be composed of a digital memory, and the data line can be constructed as a bus. In case of analog process, the memory can be composed of an analog memory in which an amount is retained for example by a charge amount, and the process can be executed by representing an amount by a pulse width and conducting a processing by a pulse width modulation. In such configuration, there may be added a circuit for converting such charge amount into a pulse width and a circuit for inverse conversion, to the data input/output lines of the memory. Regardless of the digital or analog processing, the configuration of the present invention easily enables hierarchic pattern recognition.

In the following there will be explained a case of adopting the pattern detection (recognition) apparatus of the foregoing embodiment in an image pickup apparatus, thereby achieving focusing to a specified object or color correction or exposure control for the specified object with reference to FIG. 12, which shows the configuration of an image pickup apparatus employing the pattern detection (recognition) apparatus of the foregoing embodiment.

Referring to FIG. 12, an image pickup apparatus 5101 is provided with an imaging optical system 5102 including an image taking lens and a zooming drive control mechanism, a CCD or CMOS sensor 5103, a measuring unit 5104 for image pickup parameters, an image signal processing circuit 5105, a memory unit 5106, a control signal generation unit 5107 for generating control signals for controlling the image pickup operation and the image pickup conditions, a display 5108 serving also as a view finder such as an EVF (electronic view finder), a strobe flash unit 5109 and a memory medium 5110, and is further provided with the aforementioned pattern detection apparatus as an object detection (recognition) apparatus.

The image pickup apparatus 5101 executes, by the object detection (recognition) apparatus 5111, the detection (detection of position and size) of the face image of a preregistered person in the taken image. When the information on the position and size of such person is entered from the object detection (recognition) apparatus 5111 to the control signal generation unit 5107, such control signal generation unit 5107 generates a control signal for optimizing the focus control, exposure condition control, white balance control etc. for such person, based on the output from the image pickup parameter measuring unit 5104.

Thus, the aforementioned pattern detection (recognition) apparatus can be applied to the image pickup apparatus to achieve detection of the person and optimum control of the image taking operation based on such detection.

(Second Embodiment)

Figure 6B:
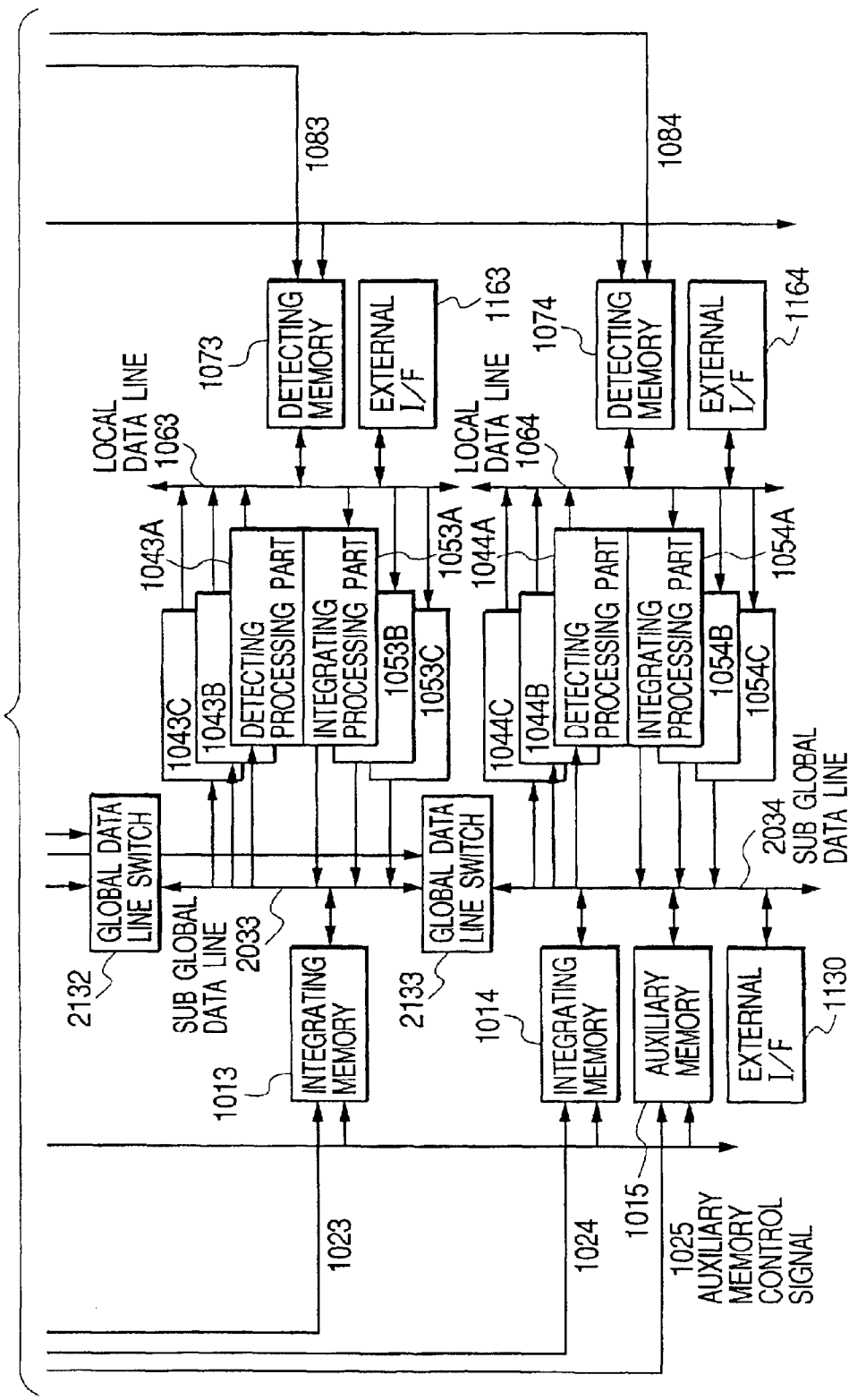
FIG. 6 is comprised of FIGS. 6A and 6B showing the configuration of a second embodiment.

FIGS. 6A and 6B show the configuration of the present embodiment, wherein components equivalent to those in FIGS. 1A and 1B are represented by like numbers. In comparison with the first embodiment, the new components in FIGS. 6A and 6B are a control part 2000, an integrating memory controller 2010, sub-global data lines 2031 to 2034, global data line switches 2131 to 2133, and switch control lines 2231 to 2233.

In contrast to the first embodiment in which the global data bus 1030 shown in FIGS. 1A and 1B are connected to all the integrating memories 1011 to 1014, the auxiliary memory 1015, all the detecting process parts 1041A to 1044C and all the integrating process parts 1051A to 1054C, a sub-global data line in the present embodiment is connected to an integrating memory, plural detecting process parts and plural integrating process parts or auxiliary memories. The number of the detecting process parts and the integrating process parts connected to a sub-global data line is basically equal to the number of layers in the hierarchic process. For example, in the present embodiment, there is assumed a hierarchic process of three layers as in the first embodiment, so that the sub-global data line 2031 is connected to an integrating memory 1011, detecting process parts 1041A to 1041C and integrating process parts 1051A to 1051C.

Also each of the global data line switches 2131 to 2133 is connected to the adjacent two of the sub-global data lines 2031 to 2034. The switch control lines 2231 to 2233 are connected to the global data line switches 2131 to 2133 and the control part 2000. The global data lines switches 2131 to 2133 respectively connect or disconnect the sub-global data lines 2031 to 2034 based on the switch control signals 2231 to 2233.

In the following there will be explained the functions specific to the present embodiment, with reference to FIGS. 6A, 6B, 7A and 7B. Other functions are similar to those explained in the embodiment 1.

Figure 7A:
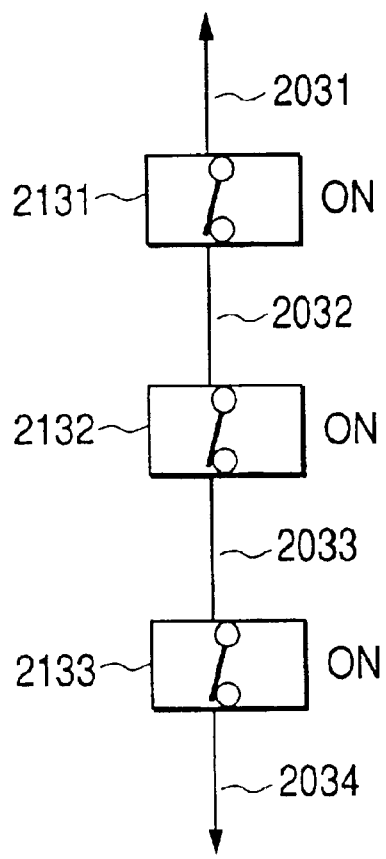

In case of entering the data retained in the auxiliary memory 1015 or the integrating memories 1011 to 1044 into the detecting process parts 1041A to 1044C, the global data line switches 2131 to 2133 are turned on as shown in FIG. 7A according to the switch control signals 2231 to 2233 from the control part 2000, whereby all the sub-global data lines 2031 to 2034 are connected. In this state, therefore, the configuration becomes substantially equal to that explained in the first embodiment, whereby the data outputted from the auxiliary memory 1015 and the integrating memories 1011 to 1014 are respectively entered into the detecting process parts 1041A to 1044C at a same timing in parallel manner.

Figure 7B:
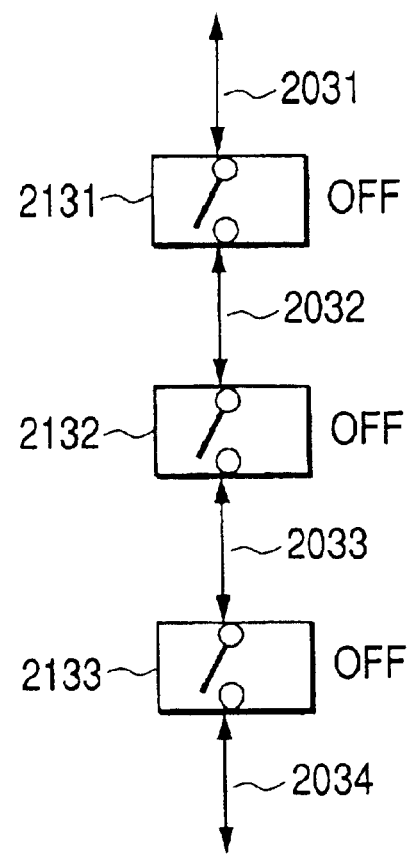
FIG. 7B is a view showing the concept of the function of the second embodiment, in a state where a global line data switch is turned off.

Also in case of retaining the results processed in the integrating process parts 1051A to 1054C in the integrating memories 1011 to 1014, the global data line switches 2131 to 2133 are turned off as shown in FIG. 7B according to the switch control signals 2231 to 2233 from the control part 2000, whereby the sub-global data lines 2031 to 2034 are disconnected. In such state, therefore, the integrating process parts 1051A to 1054A need not retain the process results in the integrating memories 1011 to 1014 on time-shared basis as explained in the first embodiment and the integrating memory controller 2010 need not execute data writing into the integrating memories 1011 to 1014 on time-shared basis, but the process results of the integrating process parts can be retained in the integrating memories at a same timing in parallel manner.

As explained in the foregoing, the present embodiment allows to enter the data of the auxiliary memory or the integrating memories into the detecting process parts at a same timing in parallel manner and to retain the process results of the integrating process parts in the integrating memories at a same timing in parallel manner, thereby being capable of a process similar to that in the first embodiment and of reducing the process time in comparison with the first embodiment.

(Third Embodiment)

Figure 8B:
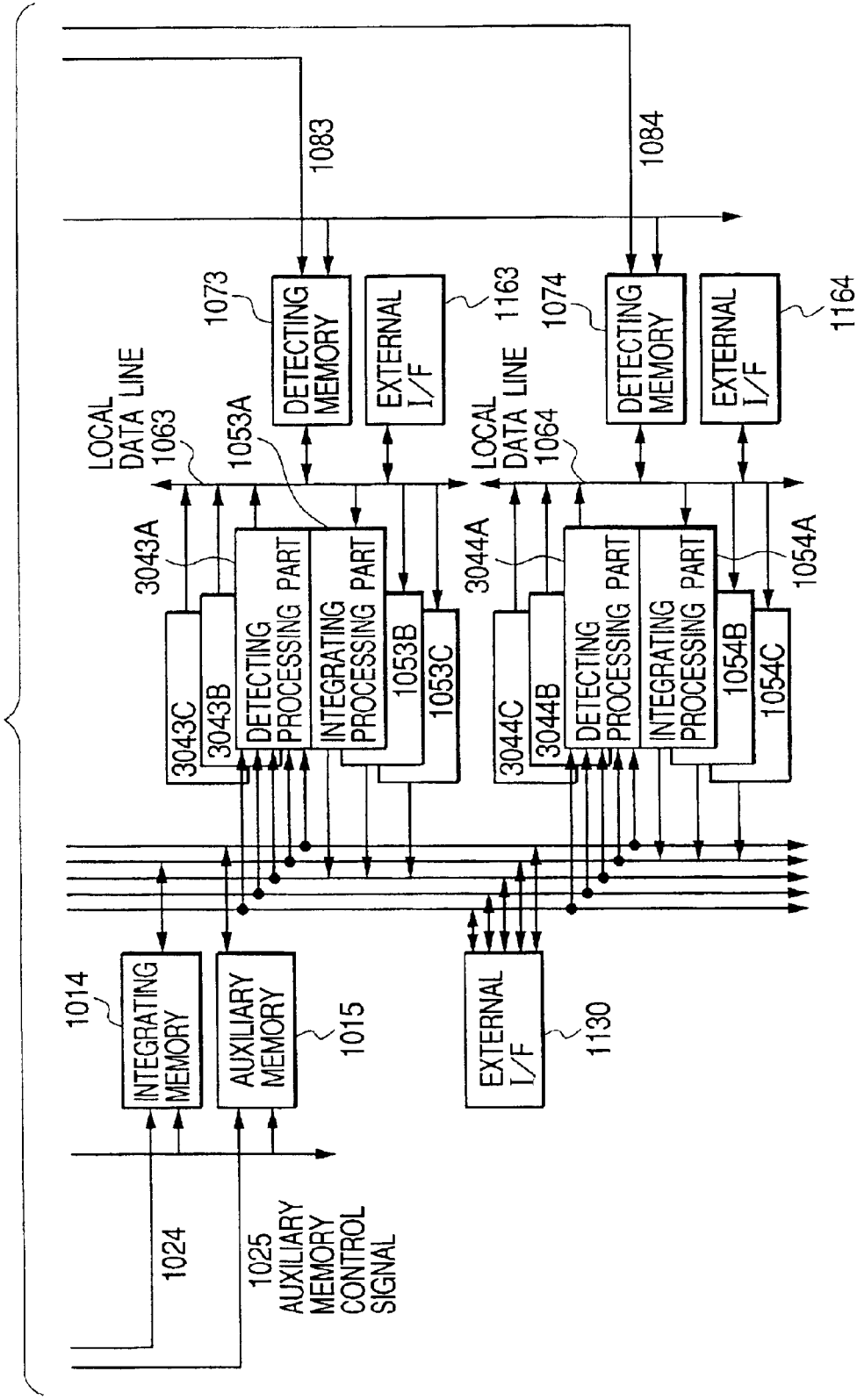
FIG. 8 is comprised of FIGS. 8A and 8B showing the configuration of a third embodiment.

FIGS. 8A and 8B show the configuration of the present embodiment, wherein components equivalent to those in FIGS. 1A and 1B are represented by like numbers. In comparison with the first embodiment, the new components in FIGS. 8A and 8B are a control part 3000, an integrating memory controller 3010, global data lines 3031 to 3035, and detecting process parts 3041A to 3044C.

In contrast to the first embodiment in which the global data bus 1030 shown in FIGS. 1A and 1B are connected to all the integrating memories 1011 to 1014, the auxiliary memory 1015, all the detecting process parts 1041A to 1044C and all the integrating process parts 1041A to 1044C and all the integrating process parts 1051A to 1054C, a global data line in the present embodiment is connected to an integrating memory or the auxiliary memory, all the detecting process parts and plural integrating process parts. The number of the integrating process parts connected to a global data line is basically equal to the number of layers in the hierarchic process. For example, in the present embodiment, there is assumed a hierarchic process of three layers as in the first embodiment, so that the global data line 3031 is connected to an integrating memory 1011, detecting process parts 3041A to 3044C and integrating process parts 1051A to 1051C. In FIGS. 8A and 8B, with respect to the connection between the global data lines 3031 to 3035 and the detecting process parts 3041A to 3044C, there are only illustrated the detecting process parts 3041A to 3044A and other parts are omitted.

Also each of the detecting process parts can receive input from all the global data lines 3031 to 3035. Such configuration enables to read the data from the integrating memories 1011 to 1014 and the auxiliary memory 1015 at a same timing after parallel operation thereof, to enter the data into all the predetermined detecting process parts 3041A to 3044C at a same timing in parallel manner, and also to retain the process results from the integrating process parts in the integrating memories 1011 to 1014 at a same timing in parallel manner.

In the following there will be explained the functions specific to the present embodiment. Other functions are similar to those explained in the embodiment 1.

In case of entering the data retained in the auxiliary memory 1015 or the process results retained in the integrating memories 1011 to 1044 into the detecting process parts 3041A to 3044C, these parts are operated in parallel manner according to the integrating memory control signals 1021 to 1024 or the auxiliary memory control signal 1025 from the integrating memory controller 3010 and, at a same timing, the integrating memories 1011 to 1014 output the data to the global data lines 3031 to 3034 while the auxiliary memory 1015 outputs the data to the global data line 3035. In this operation, the integrating memories 1011, 1012, 1013 and 1014 respectively output the data to the global data lines 3031, 3032, 3033 and 3034. Since the detecting process parts 3041A to 3034C can receive inputs from all the global data lines 3031 to 3035, the data are entered to the detecting process parts at a same timing in parallel manner.

Also in case of retaining the results processed in the integrating process parts 1051 to 1054 into the integrating memories 1011 to 1014, the data can be retained in the integrating memories 1011 to 1014 at the same time in parallel manner, since the integrating process parts 1051A to 1051C are so constructed as to execute output to the global data line 3031 while the integrating process parts 1052A to 1052C are so constructed as to execute output to the global data line 3032.

As explained in the foregoing, the present embodiment allows to enter the data of the auxiliary memory or the integrating memories into the detecting process parts at a same timing in parallel manner and to retain the process results of the integrating process parts in the integrating memories at a same timing in parallel manner, thereby being capable of a process similar to that in the first embodiment and of reducing the process time in comparison with the first and second embodiments.

(Fourth Embodiment)

Figure 9B:
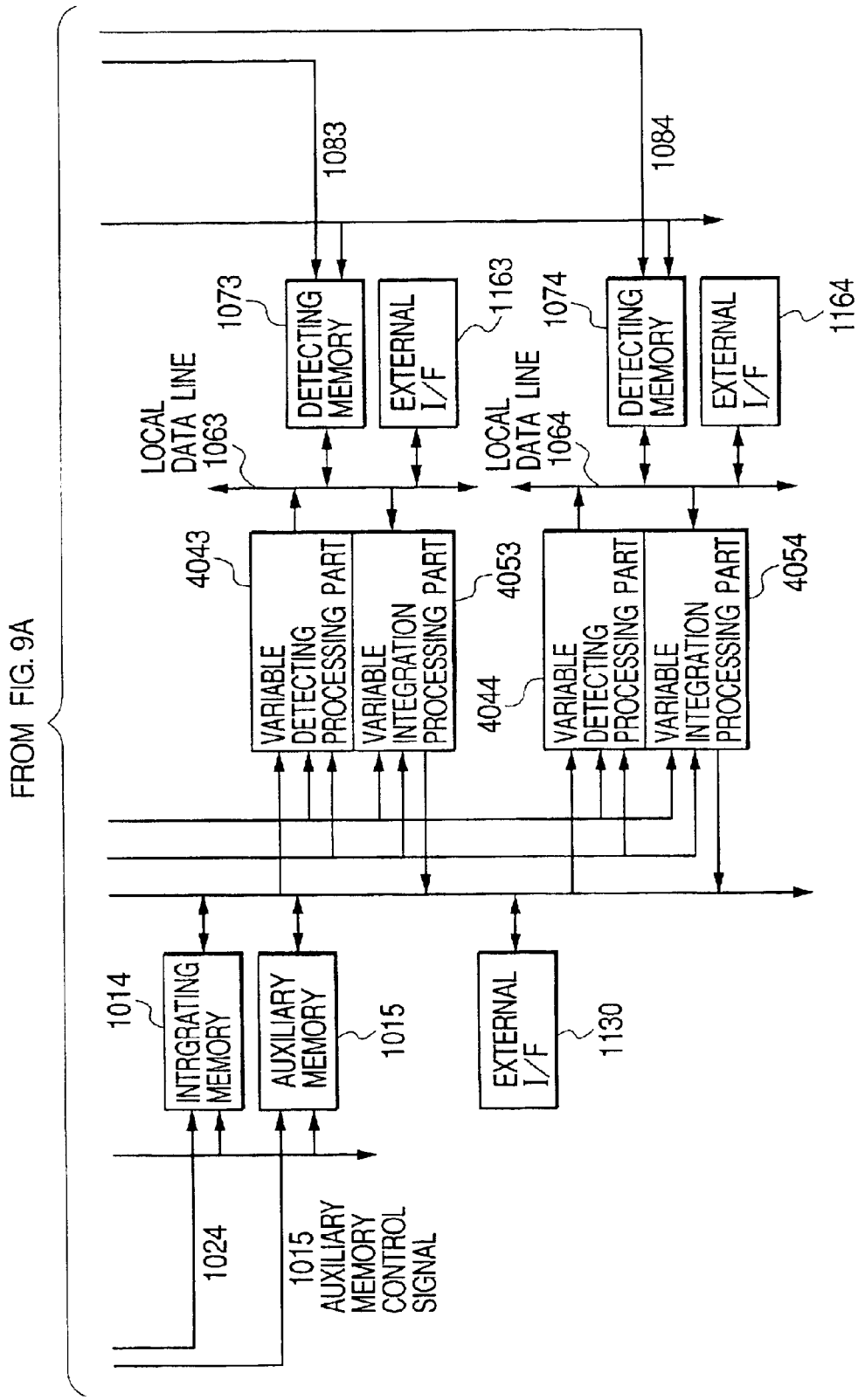
FIG. 9 is comprised of FIGS. 9A and 9B showing the configuration of a fourth embodiment.

FIGS. 9A and 9B show the configuration of the present embodiment, wherein components equivalent to those in FIGS. 1A and 1B are represented by like numbers. In comparison with the first embodiment, the new components in FIGS. 9A and 9B are a control part 4000, variable detecting process parts 4041 to 4044, variable integrating process parts 4051 to 4054, a circuit configuration memory part 4110, a circuit configuration control part 4120, variable detecting process part control signals 4111 to 4114, and variable integrating process part control signals 4121 to 4124. With respect to the variable detecting process part control signals and the variable integrating process part control signals, FIGS. 9A and 9B show the variable detecting process part control signal 4111 alone and omits others.

In contrast to the first embodiment in which all the process parts necessary for the recognition process (namely detecting process parts and integrating process parts) are prepared in advance and the process parts to be used in each processing are selected from such prepared process parts by the control signals from the control part, the present embodiment is composed of the variable detecting process parts and the variable integrating process parts of a number capable of parallel operation at a same timing.

The variable detecting process parts 4041 to 4044 and the variable integrating process parts 4051 to 4054 are formed by a logic IC which is called FPGA (field programmable gate array) and composed of plural circuit blocks and wiring blocks allowing the user to construct an arbitrary logic, or by an analog IC which is called FPAA (E. Lee, P. Gulak, 1991, "A CMOS Field-programmable Analog Array", IEEE JOURNAL OF SOLID-STATE CIRCUITS, Vol. 26, No. 12, pp.1860–1867) and which allows the user to execute an arbitrary analog process by changing the wiring between the analog block circuits or changing the charge amount in a capacitor constituting a multiplication coefficient. The circuit configuration information memory part 4110 stores information of the circuit configuration for constructing the process parts into a configuration capable of the arbitrary process. Also the circuit configuration control part 4120 serves to change the circuit configuration by controlling the process parts according to such circuit configuration information. More specifically, the variable detecting process parts 4041 to 4044 and the variable integrating process parts 4051 to 4054 are controlled according to the circuit configuration control signals from the circuit configuration control part 4120, and are reconstructed into the circuit configuration matching the circuit configuration information signals from the circuit configuration information memory part 4110.

Figure 10:
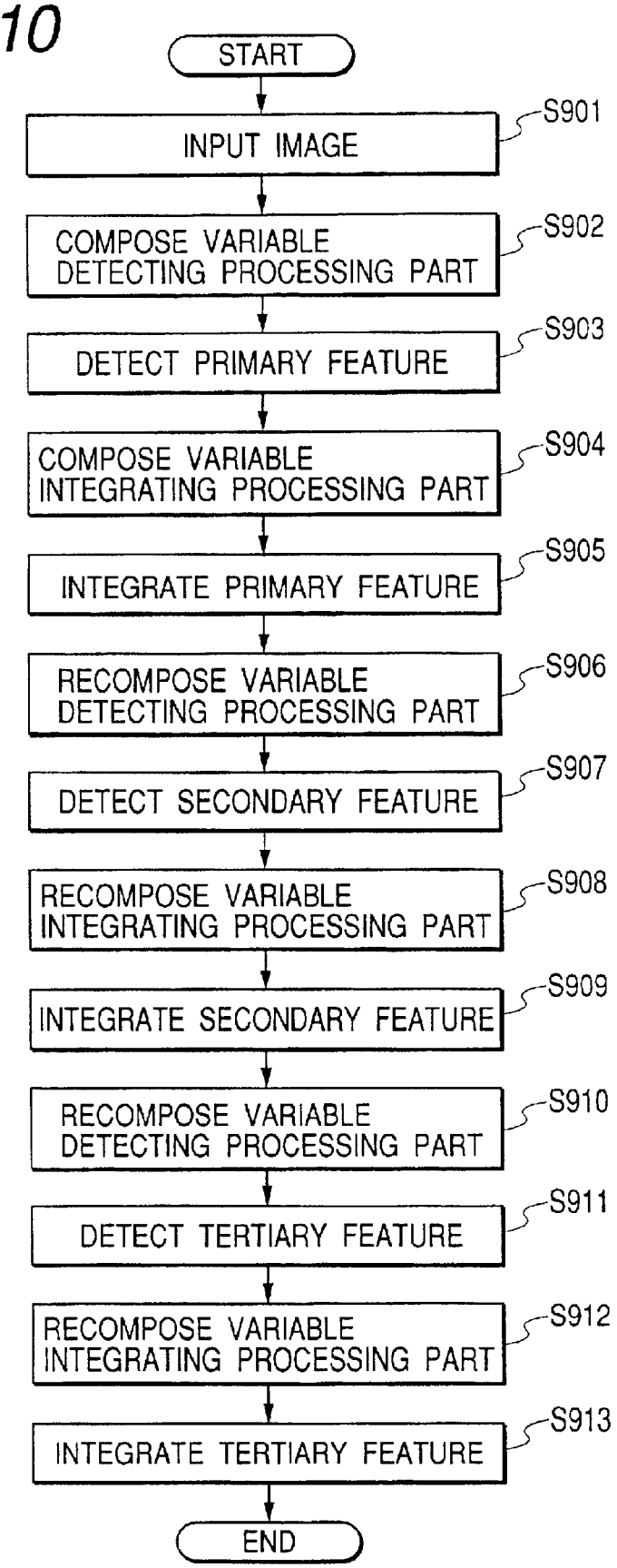
FIG. 10 is a flow chart showing the function of the fourth embodiment.

In the following, the function of the present embodiment will be explained with reference to FIGS. 9A, 9B, 10 and 11, in which FIG. 10 is a flow chart showing the function of the present embodiment. In the following there will be explained a case of detecting an eye pattern, as in the first embodiment.

Referring to FIG. 10, a step S901 enters an image into the auxiliary 1015. Then, in a step S902, in response to a signal from the control part 4000, the circuit configuration information memory part 4110 outputs a circuit configuration information signal while the circuit configuration control part 4120 outputs a circuit configuration control signal, and the circuits of the variable detecting process parts 4041 to 4044 are constructed according to such signals. In this operation, there are constructed circuits for detecting the primary features (cf. FIG. 4) in the eye pattern detection.

In a step S903, the primary features are detected by the variable detecting process parts 4041 to 4044 so constructed as to detect the primary features of the eye pattern. The integrating memory controller 1010 controls the auxiliary memory control signal 1025-to read the local data of the image from the auxiliary memory 1015 for output to the global data line 1030. Such data are entered into the variable detecting process parts 4041 to 4044 at a same timing in parallel manner for the detection of primary features. Then, in response to the end signal indicating the end of the process, the control part 4000 shifts the output signals to the enabled state, whereby the variable detecting process parts 4041 to 4044 output the process results to the local data lines 1061 to 1064. At the same time, the detecting memory controller 1090 outputs an address to the detecting address line 1080, and controls the detecting memory control signals 1081 to 1084 to retain the data on the local data lines in the detecting memories 1071 to 1074.

Then, in a step S904, in response to a signal from the control part 4000, the circuit configuration information memory part 4110 outputs a circuit configuration information signal while the circuit configuration control part 4120 outputs a circuit configuration control signal, and the circuits of the variable integrating process parts 4051 to 4054 are constructed according to such signals. In this operation, there are constructed circuits for integrating the detected primary features by operations such as local averaging or sub-sampling by detection of maximum output.

In a step S905, the primary features are integrated by the variable integrating process parts 4051 to 4054 so constructed as to integrate the primary features. The detecting memory controller 1090 outputs an address on the detecting address line 1080, and controls the detecting memory control signals 1081 to 1084 to read the local data of the detecting memories 1071 to 1074, whereby the local data are entered into the variable integrating process parts 4051 to 4054 through the local data lines 1061 to 1064 and the primary features are integrated. Then, in response to the end signal indicating the end of the process, the control part 4000 shifts the output signals to the enabled state, whereby the variable integrating process parts 4051 to 4054 output the process results to the global data line 1030 on time-shared basis. At the same time, the integrating memory controller 1010 outputs an address to the integrating address line 1020, and controls the integrating memory control signals 1021 to 1024 to retain the data on the global data line in the integrating memories 1011 to 1014.

In a step S906, in response to the circuit configuration information signal and the circuit configuration control signal, the circuits of the variable detecting process parts 4041 to 4044 are reconstructed as in the step S902. In this operation, there are constructed circuits for detecting the secondary features (cf. FIG. 4) in the eye pattern detection (Since the secondary features are three kinds, there are only reconstructed the variable detecting process parts 4041 to 4043).

In a step S907, the secondary features are detected by the variable detecting process parts 4041 to 4044 so constructed as to detect the secondary features of the eye pattern. The integrating memory controller 1010 outputs an address to the integrating address line 1020 and controls the integrating memory control signals 1021 to 1024 to read the local data of the integrated primary features from the integrating memories 1011 to 1014, for output to the global data line 1030. Such data are entered into the variable detecting process parts 4041 to 4044 at a same timing in parallel manner for the detection of aforementioned secondary features. In this operation, since the secondary features to be detected are of three kinds, the process part select signals in the variable detecting process part control signals 4111 to 4113 alone are in the enabled state. Then, in response to the end signal indicating the end of the process, the control part 4000 shifts the output signals to the enabled state, whereby the variable detecting process parts 4041 to 4044 output the process results to the local data lines 1061 to 1063. At the same time, the detecting memory controller 1090 outputs an address to the detecting address line 1080, and controls the detecting memory control signals 1081 to 1083 to retain the data on the local data lines in the detecting memories 1071 to 1073.

Then, in a step S908, based on the circuit configuration information and the circuit configuration control signal, the circuits of the variable integrating process parts 4051 to 4053 are re-constructed. In this operation, there are constructed circuits for integrating the detected primary features by operations such as local averaging or sub-sampling by detection of maximum output. This step S908 can naturally be dispensed with if the circuit configuration obtained in the step S904 can be used without change.

In a step S909, the secondary features are integrated by the re-constructed variable integrating process parts 4051 to 4053. The detecting memory controller 1090 outputs an address on the detecting address line 1080, and controls the detecting memory control signals 1081 to 1083 to read the local data of the detecting memories 1071 to 1073, whereby the local data are entered into the variable integrating process parts 4051 to 4053 through the local data lines 1061 to 1063. Each variable integrating process part executes processes such as averaging of the input data or detection of the maximum value. In this operation, the process part select signals 4121 to 4123 alone are in the enabled state in the variable integrating process part control signals. Then, in response to the end signal indicating the end of the process, the control part 4000 shifts the output signals to the enabled state in succession, whereby the variable integrating process parts 4051 to 4053 output the process results to the global data line 1030 on time-shared basis. At the same time, the integrating memory controller 1010 outputs an address to the integrating address line 1020, and controls the integrating memory control signals 1021 to 1023 to retain the data on the global data line in the integrating memories 1011 to 1013.

In a step S910, in response to the circuit configuration information signal and the circuit configuration control signal, the circuit of the variable detecting process part 4041 is reconstructed. In this operation, there is constructed a circuit for detecting the tertiary feature (cf. FIG. 4) in the eye pattern detection.

In a step S911, the tertiary feature is detected by the reconstructed variable detecting process part 4041. The integrating memory controller 1010 outputs an address to the integrating address line 1020 and controls the integrating memory control signals 1021 to 1023 to read the local data of the integrated secondary features from the integrating memories 1011 to 1013, for output to the global data line 1030. Such data are entered into the variable detecting process part 4041 for the detection of aforementioned tertiary feature. Then, in response to the end signal indicating the end of the process, the control part 4000 shifts the output signal to the enabled state, whereby the variable detecting process part 4041 outputs the process result to the local data line 1061. At the same time, the detecting memory controller 1090 outputs an address to the detecting address line 1080, and controls the detecting memory control signal 1081 to retain the data on the local data line in the detecting memory 1071.

Then, in a step S912, based on the circuit configuration information and the circuit configuration control signal, the circuit of the variable integrating process part 4051 is reconstructed. This step S912 can naturally be dispensed with if the circuit configuration obtained in the step S904 can be used without change.

In a step S913, the tertiary features are integrated by the re-constructed variable integrating process part 4051. The detecting memory controller 1090 outputs an address on the detecting address line 1080, and controls the detecting memory control signal 1081 to read the local data of the detecting memory 1071, whereby the local data of the tertiary feature are entered into the variable integrating process part 4051 through the local data line 1061. Then, in response to the end signal indicating the end of the process, the control part 4000 shifts the output signals to the enabled state in succession, whereby the variable integrating process part 4051 outputs the process result to the global data line 1030. At the same time, the integrating memory controller 1010 outputs an address to the integrating address line 1020, and controls the integrating memory control signal 1021 to retain the data on the global data line in the integrating memory 1011.

The result retained in the integrating memory 1011 constitutes the final result of the eye detection. It is also possible to dispense with the aforementioned step S313 and to utilize the result retained in the detection memory 1071 as the result of eye detection.

Figure 11:
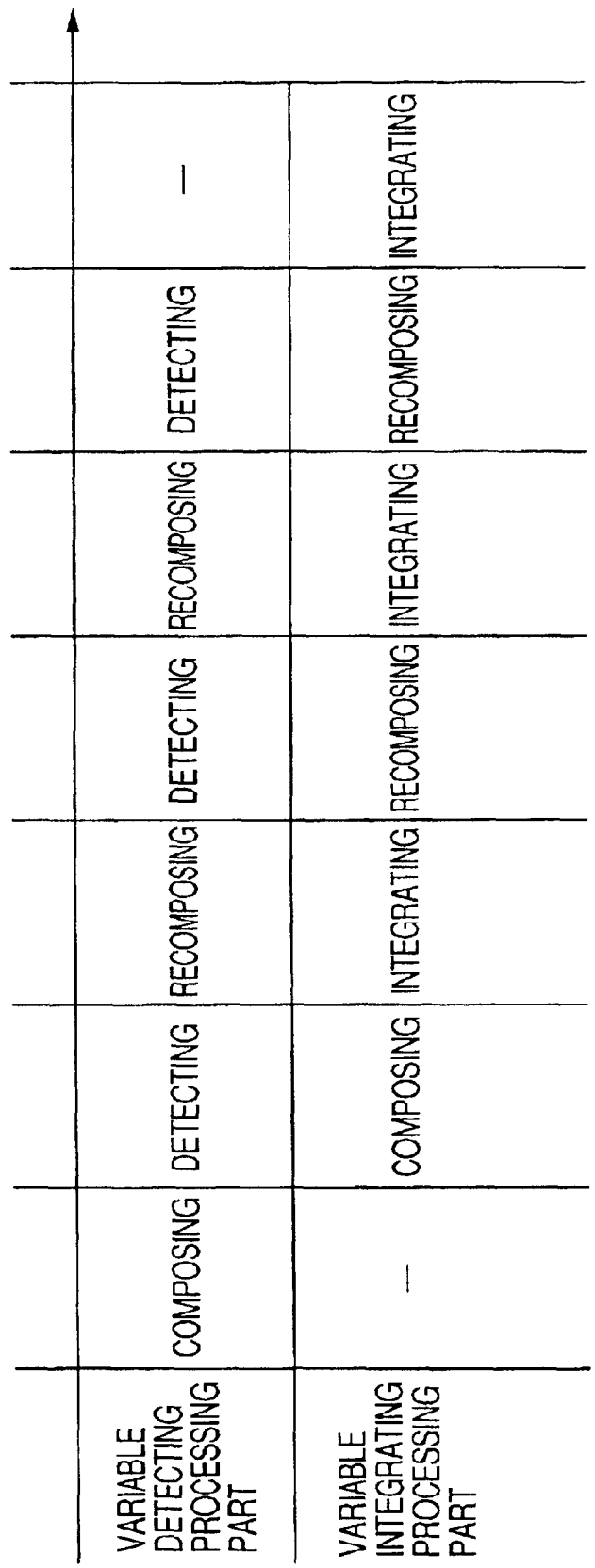
FIG. 11 is a view showing the timing of reconstruction and processing in the fourth embodiment.

In the foregoing, the reconstruction of the variable integrating process parts is executed after the detection process by the variable detecting process parts and that of the variable detecting process parts is executed after the detection process by the variable integrating process parts, but, since the variable detecting process parts and the variable integrating process parts are not operated at the same time, it is possible, as shown in FIG. 11, to simultaneously execute the detecting process by the variable detecting process parts and the reconstruction of the variable integrating process parts or the integrating process by the variable integrating process parts and the reconstruction of the variable detecting process parts. In FIG. 11, the abscissa indicates the flow of operations, and "detection" means the detecting process and "integration" means the integrating process. Also "construction/reconstruction" means construction or reconstruction of the circuits.

In the present embodiment, as explained in the foregoing, process parts variable in the circuit configuration are employed with the reconstruction of the circuits according to the process in each layer, so that the present embodiment is capable of recognition process similar to that in the first embodiment and allows to reduce the magnitude of the circuits of the process parts in comparison with the first embodiment. Also such configuration can suppress the increase in the entire process time, since the process and reconstruction of the detecting process parts and the integrating process parts can be executed alternately.

It is also possible to combine the present embodiment with the second or third embodiment.

The embodiments explained in the foregoing, by utilizing the common data line, local data lines and memories, provide an advantage of executing in parallel manner a hierarchical process of executing parallel process with plural process parts on plural results obtained by plural process parts, by a simple circuit configuration not requiring complex wirings. In the detecting process, a parallel operation is rendered possible by entering same time into the plural predetermined detecting process parts, and it is also rendered possible to spatially integrate the process results of the process parts. Also in the integrating process, it is rendered possible to execute the integrating process in parallel manner by employing a common address, indicating the position in the memories, for the plural detecting memories retaining the results of different feature detections. There is also provided an advantage that such detecting process and integrating process can be repeated by any number of times.

It is also possible to read the interim result of each layer from the memory, and to change the process of the preceding layer for example by observing such interim result. There can also be provided an advantage of preventing the increase in the process time, in case of employing process parts capable of circuit reconstruction, by alternately executing the detecting process and integrating process, and the reconstruction of the detecting process circuit and that of the integrating process circuit.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A pattern recognition apparatus for detecting a predetermined pattern contained in an input signal, comprising:
   plural detecting processing means for detecting respectively different features for a same input;
   plural integrating processing means for spatially integrating, for each process results, the features detected by said plural detecting processing means;
   plural detecting memories for retaining the process results of said detecting processing means;
   plural integrating memories for retaining the process results of said integrating processing means;
   a common data line to which all said predetermined detecting processing means and all said predetermined integrating memories are connected at a certain timing; and
   plural local data lines each of which is connected to a predetermined set of said detecting processing means, said integrating processing means and said detecting memory;
   wherein, in entering the process results of said detecting processing means retained in said detecting memories into said integrating processing means, data of a same address in said plural detecting memories are read and entered into said integrating processing means; and
   in entering the process results of said integrating processing means retained in said integrating memories into said detecting processing means, a same data in one of said plural detecting memories is read and entered into said plural detecting processing means.

2. A pattern recognition apparatus according to claim 1, wherein, in entering the process results of said integrating processing means into said integrating memories and/or in entering the data of said integrating memories into said detecting processing means, said integrating processing means and said integrating memories are so controlled as to use said common data line on time-shared basis.

3. A pattern recognition apparatus according to claim 1, wherein said common data line includes plural sub common data lines and plural switches;
   each of said sub common data lines is connected one of said integrating memories;
   in entering the process results of said plural integrating processing means into said integrating memories, said plural sub common data lines are utilized; and
   in entering the process results of said integrating processing means, retained in said integrating memories, into said detecting processing means, said plural sub common data lines are connected by controlling said switches and used as an imaginary single data line.

4. A pattern recognition apparatus according to claim 1, wherein said common data line includes plural shared common data lines;
   each of said shared common data lines is connected to one of said predetermined integrating memories and all said predetermined detecting processing means; and
   in entering the process results of said plural integrating processing means into said plural integrating memories and/or in entering the process results of said integrating processing means, retained in said integrating memories, into said detecting processing means, said plural shared data lines are used.

5. A pattern recognition apparatus according to claim 1, further comprising:
   configuration information memory means for storing configuration information; and
   circuit configuration control means for reconstructing the circuit configuration of said detecting processing means and said integrating processing means, based on the configuration information of said configuration information memory means.

6. A pattern recognition apparatus according to claim 5, wherein said circuit configuration control means executes such control as not to simultaneously execute the reconstruction of the circuit configuration of said detecting processing means and the reconstruction of the circuit configuration of said integrating processing means.

7. A pattern recognition apparatus according to claim 1, further comprising an external interface connected to said common data line, wherein the results in said detecting memories and in said integrating memories are read out through said external interface as an interim result of the process.

8. An image pickup apparatus comprises a pattern recognition apparatus according to claim 1 and image pickup means for picking up an image, wherein said pattern recognition apparatus detects a predetermined pattern contained in the image picked up by said image pickup means.

9. A pattern recognition apparatus for detecting a predetermined pattern contained in an input signal, comprising:
   plural detecting means for detecting respectively different features for a same input;
   plural integrating means for integrating the features detected by said plural detecting processing means;
   plural detecting memories for retaining detection results of said detecting processing means;
   plural integrating memories for retaining integration results of said integrating processing means;
   a common data line to which a plurality of said plural detecting processing means and a plurality of said plural integrating memories are connected at a certain timing; and
   plural local data lines each of which is connected to a predetermined set of one of said plural detecting means, one of said plural integrating means and one of said plural detecting memories,
   wherein, in entering the detection results of said detecting means retained in said detecting memories into said integrating means, data of a same address in said plural detecting memories are read and entered into said integrating means, and
   in entering the integration results of said integrating means retained in said integrating memories into said detecting means, a same data in one of said plural detecting memories is read and entered into said plural detecting means.

10. A pattern recognition apparatus according to claim 9, wherein, in entering the integration results of said integrating processing means into said integrating memories and/or in entering the data of said integrating memories into said detecting processing means, said integrating means and said integrating memories are so controlled as to use said common data line on time-shared basis.

11. A pattern recognition apparatus according to claim 9, wherein said common data line includes plural sub common data lines and plural switches,
   each of said sub common data lines is connected one of said integrating memories,
   in entering the integration results of said plural integrating means into said integrating memories, said plural sub common data lines are utilized, and in entering the integration results of said integrating means, retained in said integrating memories, into said detecting means, said plural sub common data lines are connected by controlling said switches and used as an imaginary single data line.

12. A pattern recognition apparatus according to claim 9, wherein said common data line includes plural shared common data lines;

each of said shared common data lines is connected to one of said predetermined integrating memories and all said predetermined detecting processing means; and in entering the integration results of said plural integrating means into said plural integrating memories and/or in entering the integration results of said integrating means, retained in said integrating memories, into said detecting means, said plural shared data lines are used.

13. A pattern recognition apparatus according to claim 9, further comprising:

configuration information memory means for storing configuration information; and circuit configuration control means for reconstructing the circuit configuration of said detecting means and said integrating means, based on the configuration information of said configuration information memory means.

14. A pattern recognition apparatus according to claim 13, wherein said circuit configuration control means executes such control as not to simultaneously execute the reconstruction of the circuit configuration of said detecting means and the reconstruction of the circuit configuration of said integrating means.

15. A pattern recognition apparatus according to claim 9, further comprising an external interface connected to said common data line, wherein the results in said detecting memories and in said integrating memories are read out through said external interface as an interim result of the process.

16. An image pickup apparatus comprises a pattern recognition apparatus according to claim 9 and image pickup means for picking up an image, wherein said pattern recognition apparatus detects a predetermined pattern contained in the image picked up by said image pickup means.

* * * * *

UNITED STATES PATENT AND TRADEMARK OFFICE
CERTIFICATE OF CORRECTION

PATENT NO.       : 7,039,233 B2
APPLICATION NO.  : 10/156118
DATED            : May 2, 2006
INVENTOR(S)      : Katsuhiko Mori et al.

It is certified that error appears in the above-identified patent and that said Letters Patent is hereby corrected as shown below:

COVER PAGE:
(30) Foreign Application Priority Data "May 30, 2001" should read
-- May 31, 2001 --.

DRAWINGS:
Sheet 12, Figure 9B, "INTRGRATING" should read -- INTEGRATING --.

COLUMN 1:
Line 23, "DSP's" should read -- DSPs --; and
Line 28, "object" should read -- an object --.

COLUMN 2:
Line 1, "process" should read -- process --;
Line 6, "the Japanese" should read -- Japanese --; and
Line 23, "¶ according" should read -- ¶ According --.

COLUMN 4:
Lines 24, 27 and 45, "time-shared" should read -- a time-shared --.

COLUMN 5:
Line 1, "signals 111A" should read -- signals 1111A --;
Line 12, "signals" should read -- signal --; and
Line 49, "respectively" should read -- is respectively --.

COLUMN 6:
Line 41, "I/F's" should read -- I/Fs --;
Line 49, "I/F's." should read --I/Fs.--; and
Line 51, "in case" should read -- in the case --.

COLUMN 9:
Lines 15 and 60, "time-shared" should read -- a time-shared --.

COLUMN 10:
Lines 27 and 54, "time-shared" should read -- a time-shared --; and
Line 57, "1 kind," should read -- one kind, --.

COLUMN 11:
Line 41, "achieves" should read -- achieved --;
Lines 43 and 45, "in case" should read -- in the case --.

UNITED STATES PATENT AND TRADEMARK OFFICE
CERTIFICATE OF CORRECTION

PATENT NO. : 7,039,233 B2
APPLICATION NO. : 10/156118
DATED : May 2, 2006
INVENTOR(S) : Katsuhiko Mori et al.

It is certified that error appears in the above-identified patent and that said Letters Patent is hereby corrected as shown below:

COLUMN 12:
Line 63, "¶ In case" should read -- ¶ In the case --.

COLUMN 13:
Line 8, "in case" should read -- in the case --;
Lines 16 and 19, "time-shared" should read -- a time-shared --;
Lines 22, 28, 65 and 67 "parallel" should read -- a parallel --; and
Line 41, "are connected" should read -- is connected --.

COLUMN 14:
Lines 3, 10, 22, 27, 35 and 37 "parallel" should read -- a parallel --;
Line 7, "¶ In case" should read -- ¶ In the case --;
Line 20, "3034C" should read -- 3044C --; and
Line 23, "in case" should read -- in the case --.

COLUMN 15:
Line 44, "1025-to" should read -- 1025 to --; and
Line 48, "parallel" should read -- a parallel --.

COLUMN 16:
Line 15, "time-shared" should read -- a time-shared --; and
Line 38, "parallel" should read -- a parallel --.

COLUMN 17:
Line 12, "time-shared" should read -- a time-shared --; and
Line 32, "aforementioned" should read -- the aforementioned --.

COLUMN 18:
Line 41, "same time" should read -- at the same time --;
Line 45, "parallel" should read -- a parallel --;
Line 50, "repeated by" should read -- repeated --; and
Line 55, "in case" should read -- in the case --.

COLUMN 19:
Line 41, "connected" should read -- connected to --.

UNITED STATES PATENT AND TRADEMARK OFFICE
CERTIFICATE OF CORRECTION

PATENT NO. : 7,039,233 B2
APPLICATION NO. : 10/156118
DATED : May 2, 2006
INVENTOR(S) : Katsuhiko Mori et al.

It is certified that error appears in the above-identified patent and that said Letters Patent is hereby corrected as shown below:

COLUMN 20:
Line 58, "time-shared" should read -- a time-shared --; and
Line 62, "connected" should read -- connected to --.

Signed and Sealed this

Fifth Day of December, 2006

JON W. DUDAS
*Director of the United States Patent and Trademark Office*